(12) United States Patent
Cho et al.

(10) Patent No.: US 12,199,947 B2
(45) Date of Patent: Jan. 14, 2025

(54) METHOD AND APPARATUS FOR ENABLING BIDIRECTIONAL COMMUNICATION FOR SECOND DEVICES

(71) Applicant: KT CORPORATION, Gyeonggi-do (KR)

(72) Inventors: Won-Chang Cho, Gyeonggi-do (KR);
Se-Hoon Kim, Gyeonggi-do (KR);
Il-Yong Kim, Gyeonggi-do (KR);
Kun-Woo Park, Gyeonggi-do (KR);
Sang-Hyun Park, Gyeonggi-do (KR);
Ho-Jun Jang, Gyeonggi-do (KR);
Ji-Young Jung, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 18/242,670

(22) Filed: Sep. 6, 2023

(65) Prior Publication Data

US 2024/0106794 A1    Mar. 28, 2024

(30) Foreign Application Priority Data

Sep. 6, 2022 (KR) ........................ 10-2022-0112934

(51) Int. Cl.
*H04L 61/5007* (2022.01)
*H04L 101/659* (2022.01)

(52) U.S. Cl.
CPC .... *H04L 61/5007* (2022.05); *H04L 2101/659* (2022.05)

(58) Field of Classification Search
CPC .......... H04L 61/5007; H04L 2101/659; H04L 45/00; G06Q 50/50; G06Q 50/01; H04W 76/10; H04W 88/02
See application file for complete search history.

(56) References Cited

U.S. PATENT DOCUMENTS

| | | | | |
|---|---|---|---|---|
| 11,128,596 | B2 * | 9/2021 | Bhaskaran | ............... H04L 61/58 |
| 12,021,749 | B2 * | 6/2024 | Xu | .......... H04L 45/745 |
| 2008/0031189 | A1 * | 2/2008 | Choi | ....................... H04W 8/26 370/329 |
| 2013/0094444 | A1 * | 4/2013 | Lai | ........... H04W 4/70 370/328 |
| 2013/0223230 | A1 * | 8/2013 | Swaminathan | ........ H04W 76/10 370/241 |
| 2015/0029866 | A1 | 1/2015 | Liao et al. | |

(Continued)

FOREIGN PATENT DOCUMENTS

| | | | | | |
|---|---|---|---|---|---|
| CA | 3076384 | A1 * | 9/2020 | .......... | H04W 68/005 |
| CN | 102984295 | A * | 3/2013 | .......... | H04L 61/1511 |

(Continued)

*Primary Examiner* — Alina A Boutah
(74) *Attorney, Agent, or Firm* — IP Legal Services, LLC

(57) ABSTRACT

Provided are a method and apparatus for a user equipment, a core network, and a second device to enable bidirectional communication for second devices. The method of the second device may include receiving internet protocol (IP) configuration information for automatically configuring an IP version 6 (IPv6) address of the second device from a core network through a user equipment; generating the IPv6 address using information in the IP configuration information; and transmitting the generated IPv6 address to the core network through the UE.

17 Claims, 16 Drawing Sheets

(56) References Cited

U.S. PATENT DOCUMENTS

| | | | |
|---|---|---|---|
| 2016/0036772 A1* | 2/2016 | Pratapa | H04L 61/5038 |
| | | | 709/245 |
| 2016/0065686 A1 | 3/2016 | Park et al. | |
| 2018/0189005 A1* | 7/2018 | Perez | H04N 1/00854 |
| 2020/0100308 A1 | 3/2020 | Lee et al. | |
| 2020/0280614 A1 | 9/2020 | Park et al. | |
| 2021/0058445 A1 | 2/2021 | Choi | |
| 2021/0250843 A1 | 8/2021 | Baek et al. | |
| 2021/0320897 A1* | 10/2021 | Stojanovski | H04W 4/50 |
| 2022/0022128 A1* | 1/2022 | Takakura | H04W 8/26 |
| 2022/0417737 A1* | 12/2022 | Zhang | H04L 12/66 |
| 2023/0082507 A1 | 3/2023 | McMenamy et al. | |
| 2024/0098806 A1* | 3/2024 | Dimitrovski | H04W 76/10 |

FOREIGN PATENT DOCUMENTS

| | | | | |
|---|---|---|---|---|
| CN | 109548009 A * | 3/2019 | | H04L 61/2053 |
| EP | 3641423 A1 * | 4/2020 | | H04W 48/16 |
| EP | 3525545 B1 * | 7/2021 | | H04L 47/19 |
| GB | 2416958 A * | 2/2006 | | H04L 63/0272 |
| KR | 10-2008-0012729 A | 2/2008 | | |
| KR | 10-2016-0025996 A | 3/2016 | | |
| KR | 10-1776882 B1 | 9/2017 | | |
| KR | 10-2019-0083214 A | 7/2019 | | |
| WO | WO-2017130495 A1 * | 8/2017 | | H04L 61/5014 |
| WO | 2018/143763 A1 | 8/2018 | | |
| WO | WO-2020036882 A1 * | 2/2020 | | H04L 61/1511 |
| WO | WO-2020185949 A2 * | 9/2020 | | H04L 65/1016 |
| WO | WO-2021034093 A1 * | 2/2021 | | H04W 12/06 |
| WO | 2021/175951 A1 | 9/2021 | | |

* cited by examiner

FIG. 5

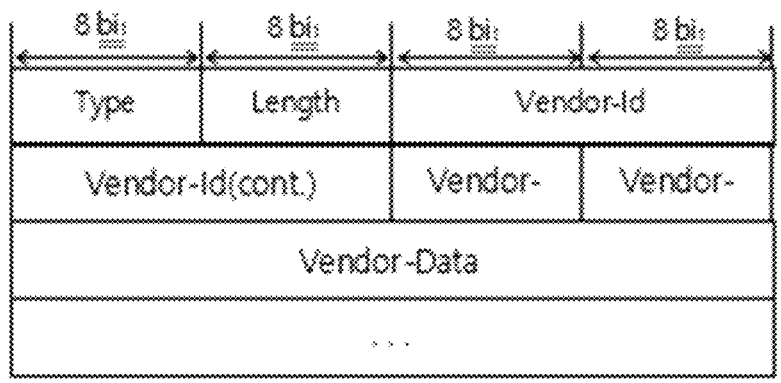

- RADIUS AVP(Attribute-Value Pairs) Definition
    - Type
        - 26 : Vendor ID
    - Vendor-Id
        - 1028142945 : KT
        - Vendor-type
        - 200 : Support Interface
            - ◆ Vendor-Data (8bit)
            - ◆ 0 : WiFi
            - ◆ 1 : Bluetooth
            - ◆ 2 : USB
            - ◆ 4 : RJ45
            - ◆ 8 ~ 255 : To be defined later ※ in case of no corresponding option field, all options applied
        - ➢ 201 : Address generating rule
            - ◆ Vendor-Data (8bit)
            - ◆ 0 : KT generation method 1 (IPv6 64bit prefix + PDN info+ MAC add)
            - ◆ 1 : KT generation method 2 (IPv6 64bit prefix + MAC add + PDN info)
            - ◆ 2 ~ 9 : To be defined later
            - ◆ 10 : EUI-64
            - ◆ 11 : Modified EUI-64
            - ◆ 12 : Auto-generate Pseudo Random
            - ◆ 13 ~ 255 : To be defined later ※ In case of no corresponding option field, device vendor-specific method applied
        - ➢ 202 : PDN Information
            - ◆ Vendor-Data (16bit)
            - ◆ 0 : internet
            - ◆ 1 : tethering
            - ◆ 2 : p5g_internet
            - ◆ 3 : p5g_tethering
            - ◆ ...

※ In case of no corresponding option field, device vendor-specific method applied.

FIG. 8

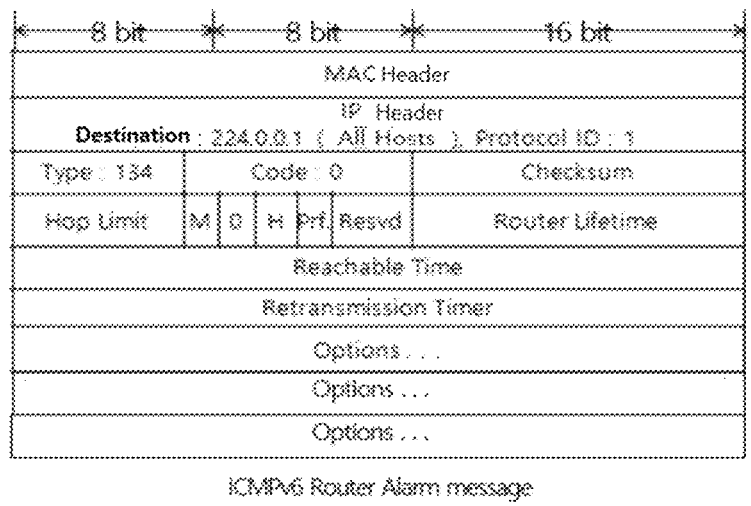

ICMPv6 Router Alarm message

- ICMPv6 router alarm message Options field definition
    - Options Type
        - 1 ~ 41 : reserved value
        - 42 ~ 137 : vendor-specific value
        - 42 : Support Interface
            - Options value (8bit)
            - 0 : WiFi
            - 1 : Bluetooth
            - 2 : USB
            - 4 : RJ45
            - 8 ~ 255 : To be defined later ※ In case no option field, all options applied
        - 43 : Address generating rule
            - Options value (8bit)
            - 0 : KT generation method 1 (IPv6 64bit prefix + PDN info + MAC add)
            - 1 : KT generation method 2 (IPv6 64bit prefix + MAC add + PDN info)
            - 2 ~ 9 : To be defined later
            - 10 : EUI-64
            - 11 : Modified EUI-64
            - 12 : Auto-generate Pseudo Random
            - 13 ~ 255 : To be defined later ※ In case no option field, device vendor-specific method applied
        - 44 : PDN Information
            - Vendor-Data (16bit)
            - 0 : internet
            - 1 : tethering
            - 2 : p5g_internet
            - 3 : p5g_tethering
            - ...

※ In case no option field, device vendor-specific method applied,
        - 138 ~ 254 : reserved value FIG. 10
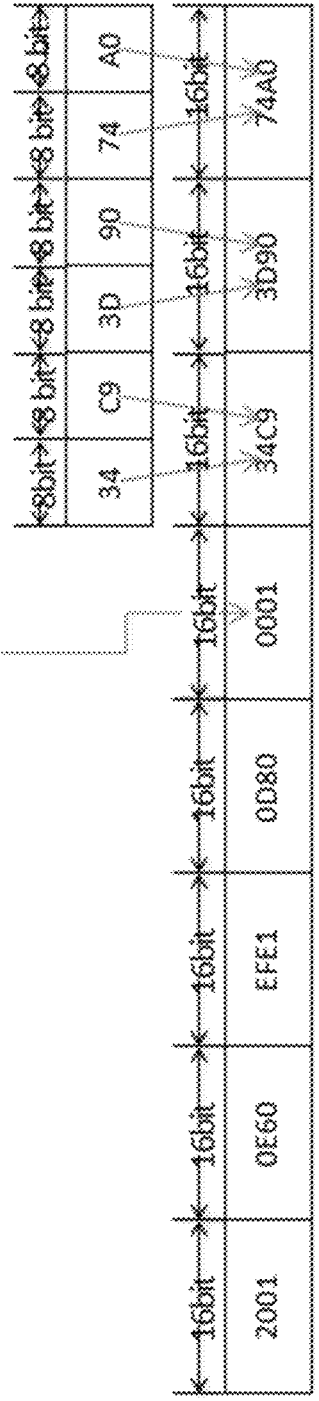
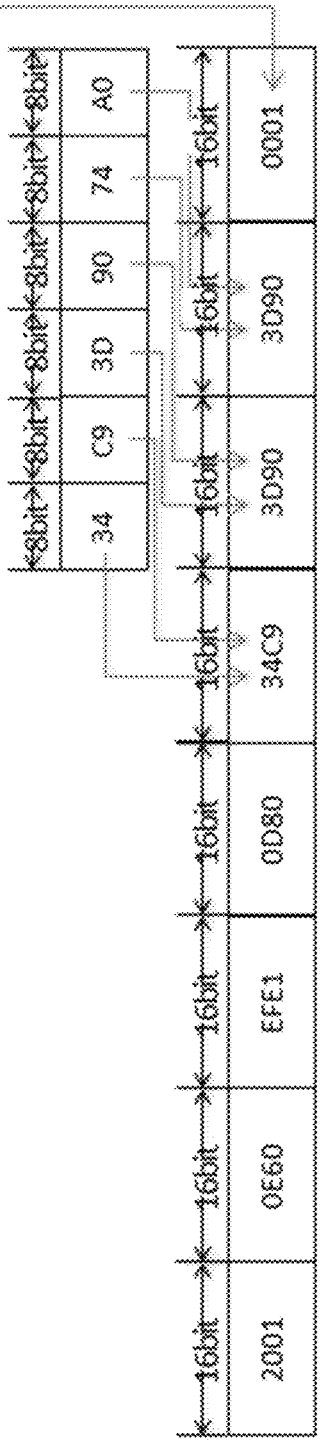

METHOD AND APPARATUS FOR ENABLING BIDIRECTIONAL COMMUNICATION FOR SECOND DEVICES

BACKGROUND

The present disclosure relates to a method and apparatus for enabling bidirectional communication for second devices. Particularly, the present disclosure relates to a method and apparatus for a second device, a user equipment, and a core network to enable bi-directional communication for the second device by configuring an IP address by the second device and authenticating and managing the IP address of the second device.

A second device is referred to as an electronic device frequently used in conjunction with a primary device, such as a smart phone to perform specific tasks or functions. For example, the primary device is usually the main device, such as a smart phone, while the second device complements or enhances its capabilities in some way. The second device may be an information technology (IT) that is used for processing, storing, transmitting, or manipulating digital information. Typically, the second device includes a tablet PC, a smart watch, an artificial intelligent (AI) speaker, a virtual reality (VR) headset. The second device may also refer to Internet of Thing (IoT) devices.

In order to use such a second device, it is necessary to perform a linking process for linking the primary device (e.g., smart phone) with the second device. For example, a smart phone and a second device may be connected to each other through Bluetooth link or WiFi link. After linking, the smart phone and the second device exchange necessary data for providing a predetermined service to users through a designated app installed in both the smart phone and the second device. As described, all services of the second device are controlled through the smart phone. Furthermore, the second devices are incapable of communicate with other device on a public network without the smart phone because the second devices are typically manufactured or produced to have only a limited communication function. That is, the second device could not be assigned with a public IP address. Therefore, the second device is invisible from the public network.

Accordingly, such a limited communication function of the second device may have the following difficulties and drawbacks.

First, both the primary device and the second device must be embedded with various integration technologies for web-based data traffic transmission, such as polling, data traffic relay, port forwarding. Therefore, there is an increase in development complexity and challenges related to software operation and maintenance.

Second, the complexity increases because of the involvement of smartphones in the process of providing the services. For example, when network services (e.g., second device internet connectivity) are required, the complexity of network address translation increases.

Third, the second device may not have a public IP address. Therefore, certain applications that require a public IP address cannot function properly.

Fourth, when security is needed for specific services on the second device, there can be challenges with handling security protocols. For example, protocols link IPsec can lead to header manipulation, potentially causing malfunctions and issues in the smartphone, leading to disruptions.

Fifth, it is not feasible to provide peer-to-peer (P2P) application services requiring direct communication between second devices each connected to different primary devices (e.g., smartphones) or between an internet device and a second device.

Sixth, each time that traffic from the second device accesses an external network, the need for address translation and header checksum recalculation results in traffic delays and performance degradation.

Seventh, the second device may require different input interfaces (USB, RJ45) apart from Bluetooth or WiFi connection. In this case, there is no standardized method via smartphone integration to connect to wireless networks, thereby lacking a standardize approach.

For the integration of services through the connection between smartphones and second devices, the smartphones need to be developed to support network layer functions such as 801.1x authentication for the second device, IP allocation based on DHCP server with the smartphone, and legacy protocol support for network management. However, this presents a challenge since the operational methods of smartphones, which provide services through app-based clients and HTTP-based API communication, differ significantly. As a result, it becomes difficult for smartphone manufacturers or OS developers to support theses functionalities.

To address the issue of IP address exhaustion when accommodating various IoT devices, IPv6 was introduced. However, in practical wireless networks, IP management for second devices is lacking. As a result, in wireless networks, the IP address of the end device such as second device is often unknown, leading to a problem where bidirectional communication cannot be supported by the wireless network.

Due to the inability to acquire and manage IP addresses for second devices in typical wireless networks, bidirectional communication with the second devices was not possible. Specifically, communication was limited to unidirectional communication where the second device requires data from the smartphone, which in turn requested the data from the wireless network for transmission. Direct bidirectional communication from external devices to the second device via the wireless network (sending data or commands) was not feasible.

In attempts to overcome this limitation, some approaches utilized virtual private networks (VPNs) to assign private IPs to second devices. However, this approach requires the setup of VPN servers, integration of VPN functionality, and the use of separate router equipment. Moreover, the wireless network's inability to directly manage and control private IPs poses a challenge, making it difficult to accommodate the rapidly increasing number of second devices using this method along.

SUMMARY

In accordance with an aspect of the present embodiment, a method and apparatus for a user equipment, a second device, and a core network to enable bidirectional communication for the second device by automatically configuring a public IP address of the second device, authenticating, and managing the public IP of the second device.

In accordance with another aspect of the present embodiment, a public IP address may be automatically configured by a second device without setting up a virtual private network (VPN) server, equipping a VPN function, and additional router device. Accordingly, a core network is able to process packets transmitted to the second device as a destination from any devices on a public network, and bi-directional communication is enabled for the second device without the need for additional costs or equipment deployment.

In accordance with one embodiment, a method of a user equipment may be provided for enabling bidirectional communication of a second device. The method may include: transmitting a packet data unit (PDU) session establishment request to a core network for bidirectional communication of the second device; receiving internet protocol (IP) configuration information for automatically configuring an IP version 6 (IPv6) address of the second device from the core network; transmitting the IP configuration information to the second device; receiving the IPv6 address of the second device, which is automatically configured based on the IP configuration information, from the second device; and transmitting the IPv6 address of the second device to the core network.

The IP configuration information received from the core network may include IPv6 prefix and an address generation rule.

The IPv6 address of the second device includes a Prefix area including the IPv6 Prefix and an auto configuration area which is generated by converting identification information of the second device based on the address generation rule.

The Prefix area may include 64 bits setup by the core network. The auto configuration area may include 64 bits configured by the second device.

TPv6 address of the second device may include hierarchical information for hierarchically managing the IPv6 address of the second device.

The hierarchical information may include at least one of a service type of the second device, a tariff plan applied to the second device, and packet data network (PDN) information.

The receiving IP configuration information may include: transmitting an ICMPv6 router request to the core network; and receiving a response ICMPv6 message in response to the ICMPv6 router request, and the received response ICMPv6 message may include the IP configuration information.

The transmitting IP configuration information to the second device may include: receiving an ICMPv6 router request message from the second device; and transmitting a response ICMPv6 message in response to the received ICMPv6 router request message, the transmitted ICMPv6 router advertisement message may include the IP configuration information.

The method may further include: after transmitting the IPv6 address of the second device to the core network, receiving traffic having the IPv6 address of the second device as a destination; and selecting an access interface corresponding to the IPv6 address of the second device based on a routing table, transmitting traffic to the second device through the selected access interface.

In accordance with another embodiment, a method of a core network may be provided for enabling bidirectional communication of a second device. The method may include: generating a packet data unit (PDU) upon receiving a PDU session establish request for communication of a second device from a user equipment (UE); transmitting Internet Protocol (IP) configuration information for automatically configuring an IPv6 address of the second device to the UE; receiving an IPv6 address of the second device from the UE; and processing traffic having the IPv6 address as a destination using the received IPv6 address.

In accordance with still another embodiment, a method of a second device may be provided for enabling bidirectional communication. The method may include: receiving internet protocol (IP) configuration information for automatically configuring an IP version 6 (IPv6) address of the second device from a core network through a user equipment; generating the IPv6 address using information in the IP configuration information; and transmitting the generated IPv6 address to the core network through the UE.

The IP configuration information may include IPv6 prefix and a address generation rule to the UE. The generating IPv6 address may include: generating an IPv6 prefix area of the IPv6 address by inserting the IPv6 Prefix in the IP configuration information, which is generated by the core network based on scription and management information of the second device and a network policy; and generating an auto-config area of the IPv6 address by converting identification of the second device based on the address generation rule.

BRIEF DESCRIPTION OF THE DRAWINGS

FIG. 5 illustrates a radius message that transmits a session management function (SMF) by a data network authentication, authorization, and accounting (DN-AAA) system in accordance with an embodiment.

FIG. 8 is a diagram illustrating an ICMPv6 router alarm message transmitted to a user equipment by session management function (SMF).

FIG. 10 is a diagram illustrating two examples of automatically configuring an IPv6 address in accordance with an embodiment.

DETAILED DESCRIPTION OF EMBODIMENTS

In accordance with one embodiment, a second device may receive IP configuration information from a core network through UE and generates own public IP address based on the IP configuration information. Accordingly, the second device may be visible to other devices on the public network and enabled to bidirectionally communicate with other devices on the public network.

In accordance with another embodiment, a core network may collect subscription and registration information on second devices from a service server, generate policy information including device management information, hierarchical management information, IP configuration information, and naming rule information, and distribute the policy information to at least one of internal nodes of the core network, UE, and second device using reserved fields of typical protocol messages. Accordingly, without requiring modification of existing network infrastructure, the core network may be able to deliver necessary information for enabling the bidirectional communication service for the second device to at least one of the second device, the internal nodes of core network, and the UE.

In accordance with further another embodiment, a user equipment (UE) may operate as a role of a router for enabling the bidirectional communication service for the second device. That is, UE may deliver data and messages for enabling the bidirectional communication service for the second device. Further, UE may receive various user inputs and manage the bidirectional communication server of the second devices based on the user inputs.

Figure 1:
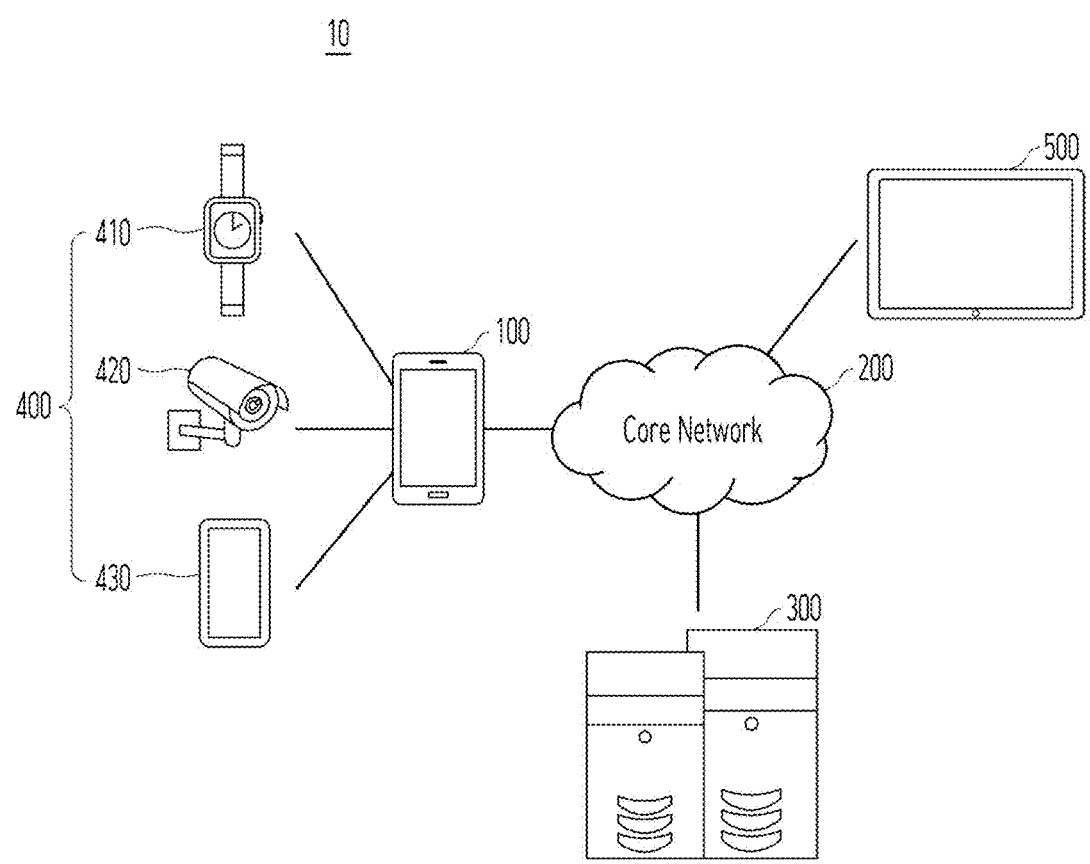
FIG. 1 is a diagram illustrating a second device access control system in accordance with an embodiment.

Hereinafter, a method and apparatus for enabling a second device for bidirectional communication with other devices on a public network in accordance with an embodiment will be described with reference to FIG. 1. FIG. 1 is a diagram describing a system for enabling a second device for bidirectional communication with other devices on a public network in accordance with an embodiment.

Referring to FIG. 1, system 10 may include at least one of second devices 400 (410, 420, and 430), user equipment (UE) 100, core network 200, server 300, and other device 500 in accordance with an embodiment. Second devices 400 may be devices that are only capable of directly communicating with UE 100 but incapable of bi-directly communicating with another device 500 on core network 200. System 10 may enable second devices 400 to bi-directionally communicate with other device 500 on core network 200 by automatically generating and assigning an Internet Protocol (IP) address (e.g., IP version 6 (IPv6) address) to second devices 400 through UE 100 in accordance with an embodiment.

In accordance with an embodiment, second devices 410, 420, 430 may be connected to user equipment 100 through a local network or a communication link and transmit and receive data to and from user equipment 100. Local network may be a wireless local area network such as Bluetooth or Wi-Fi as well as a wired network USB, JR45.

Each of second devices 410, 420, and 430 may include a communication circuit for transmitting and receiving data such as IP configuration information, IPv6 address, a router request message by communicating with user equipment 100, a control processor for controlling overall operation of second device and automatically setting up an IPv6 address, and a memory for storing necessary data for operating second devices.

Second devices 410, 420, and 430 may be wearable devices, such as health care devices, smart glasses, smart watches, HDM devices, VR/AR supporting devices, which are connected to user equipment 100. However, the embodiments are not limited thereto. For example, second devices may be various IoT devices, such as devices in a smart factory, devices in a smart home, devices in a smart farm, and devices in a smart office.

User equipment 100 may be equipped with a universal subscriber identity module (USIM). However, second devices 410, 420, and 430 may be not required to equip with a USIM in accordance with an embodiment. Without the USIM, bi-directional communication may be provided to second devices 410, 420, and 430 by automatically setting up, authenticating, and managing IP addresses in accordance with an embodiment.

In accordance with an embodiment, second device 400 may receive IP configuration information from core network 200 through UE 100, configure an IPv6 address based on the IP configuration information, and transmit the configured IPv6 address to core network 200 through UE 100.

User equipment 100 may be connected to second devices 410, 420, and 430 through a local network or a dedicated communication link and transmit and receive data to and from second devices 410, 420, and 430. User equipment 100 may be connected to a wireless network (e.g., radio network) including a core network 200 and transmit and receive data to and from a wireless network. The wireless network may be a mobile communication network operated by a network service provider. User equipment 100 may be connected to core network 200 through a wireless network including a base station.

User equipment 100 may be a mobile device, such as a smart phone, which is installed with a mobile operating system and enables a user to use various applications and contents, for example, a personal computer (PC). However, the embodiments are not limited thereto. User equipment 100 may be any device connected to a wireless network and capable of data communication, such as a tablet and a laptop computer. User equipment 100 may be any device capable of data communication with being connected to a wireless network. Further, user equipment 100 may be connected to an Internet network, provide a wireless data communication service and a voice call service.

In accordance with an embodiment a bidirectional communication service app may be installed in user equipment 100 in accordance with an embodiment. Hereinafter, a part or entire operation of user equipment 100 may be performed by the bidirectional communication service app. User equipment 100 may be also referred to as a user device or a mobile device.

In accordance with an embodiment, UE 100 may be a role of a router for enabling the bidirectional communication service for second device 400.

Core network 200 may include a radio access network and a wireless network. In the specification, core network 200 may be 5G standalone core network.

Core network 200 may include an access and mobility management function (AMF), session management function (SMF), unified data management (UDM), data network authentication, authorization, and accounting (DN-AAA), unified data repository (UDR), user plane function (UPF). These functions are also referred to as network functions (NF) or internal nodes of a core network. Each of these functions may be a network device or a network node performed assigned functions.

User equipment 100 may access a user plane function (UFP) 30 through a base station and access a data network (DN) through UPF 30. UPF may support access packet data unit (PDU) session, packet routing and forwarding, QoS process for data network (DN). DN may be referred to a data network that UE 10 access, and PDU may be referred to a data exchanged between UE and DN.

AMF may support registration, connection, and mobility functions for enabling UE 100 to receive a service from DN. SMF may support session management, IP address allocation, User Plane Function (UPF) selection and control. UDM may support user identification process, subscription information management. DN-AAA may support authentication of data network access.

Core network 200 may further include a network exposure function (NEF) and a service control function (SCF). SCF may be referred to as application function (AF) that may be used to cooperate and integrate with internal nodes of core network 200. SCF may cooperate and integrate internal nodes of core network 200 through NEF. However, the embodiments are not limited thereto. SCF may be embedded into server 300. NEF may operate as a gateway for exchanging data between internal nodes and SCF.

In accordance with an embodiment, core network 200 may receive subscription and management information from server 300, generating policy information including the IP configuration information, and providing the IP configuration information to second device 400 through UE 100. Further, core network 200 may also distribute the policy information including device management information, hierarchical management information, and naming rule information as well as the IP configuration information through internal nodes of core network 200, UE 100, and second device 400.

Server 300 may be a computer system of a service provider company that offers a service to enable a second device for bidirectional communication with other devices on a public network. Hereinafter, such a service is referred to as a bidirectional communication service. In order to provide the bidirectional communication service, server 300 may provide an application, a program, an app, and a web-site that allow users to register or subscribe for the bidirectional communication server in accordance with an embodiment. For example, a user may download application, app, or software program on his/her devices, such as UE 100, install the downloaded app, and execute the installed app. Such an executed app may provide a user interface (UI) for registering and subscribing the bidirectional communication service. As another example, a user may access a designated web-site operated by server 300 and register or subscribe the bidirectional communication service through the designated web-site. As further another example, a second device may be manufactured or produced to include a hardware function or a software function to receive the bidirectional communication service.

Through the user interface provided by the executed application or the web-site, a user or a subscriber is allowed to register at least one of second devices 400 to have the bidirectional communication service. That is, the registered second device may be enabled to automatically generate an IPv6 address and communicate with other device on the public network using the generated IPv6 address in accordance with an embodiment.

In accordance with an embodiment, server 300 may provide subscription and management information to core network 200 including SCF to enable SCF to build policies based on the subscription and management information. Server 300 may deliver subscription agreements including information on registration of users to core network 200, such as UDR and SCF.

Figure 2A:
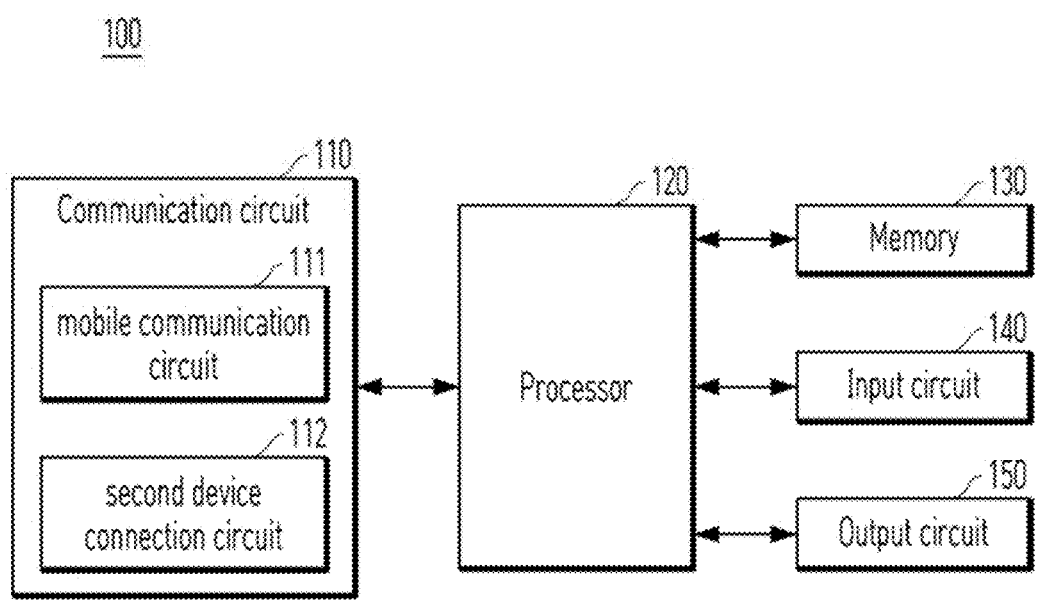
FIG. 2A is a block diagram illustrating user equipment (UE) in accordance with an embodiment.

Hereinafter, UE 100 and second device 400 will be described with reference to FIG. 2A and FIG. 2B. FIG. 2A is a block diagram illustrating user equipment (UE) in accordance with an embodiment.

Referring to FIG. 2A, UE 100 may include communication circuit 110, processing circuit 120, memory 130, input circuit 140 and output circuit 150.

Communication circuit 110 may include at least one circuitry module (or at least one circuit) for communicating with other entities through core network 200 or directly communication with second device 400. Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TIS-PAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiment, communication circuit 1300 may include at least one of a wireless communication circuit and a wired communication circuit. Herein, the wireless communication circuit and wired communication may be separately or integrally configured.

In accordance with an embodiment, communication circuit 110 may include mobile communication circuit module 111 and second device access circular module 112. Mobile communication circuit module 111 may access a radio network operated by a network operator, transmit data to, receive data from the radio network, or transmit data to, receive data from another device or server through the radio network (e.g., wireless network). Further, mobile communication circuit module 111 may transmit data to or receive data from another device in order to provide a wireless data communication service, a voice call service, and a bi-directional communication service of the second device. For example, mobile communication circuit module 111 may include a universal subscriber identity module (USIM) in accordance with an embodiment.

Second device access circuit module 112 may provide an access interface to be connected to second devices 410, 420, 430, and a location area network (LAN) 500. The access interface may be referred to as a connection interface or a communication interface. For this purpose, second device access circuit module 112 may include a short distance wireless communication interface for supporting a short wireless communication, such as Bluetooth or WiFi as well as a wired network connection interface, such as a USB port for supporting a wired communication such as USB, RJ45.

Processing circuit 120 may perform or control overall operation of UE 100. For example, processor 120 may be a central processing circuitry that controls constituent elements (e.g., memory, communication circuit, display, input/output circuit, etc.) of UE 100 and/or performs a variety of operations (or functions) of UE 100 for enabling bidirectional communication service for second device 400. Processing circuit 120 may be a set of processors, such as a dedicated processing circuit for image processing, or independent image processor. In accordance with an embodiment, processing circuit 120 may perform various operations for providing a bidirectional communication service to second device 400. Further, processing circuit 120 may various functions for the role of a router.

Memory 130 may store a variety of information, such as software programs for operation, data received from other entities, and data generated as result of operations. That is, memory 130 may store an operation system data, applications, and related data, received from other entities through a variety of communication media (e.g., communication networks). Memory 130 may include at least one of an internal memory and an external memory according to embodiments. For example, memory 130 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Input circuit 140 may be a user interface for receiving input from a user. For example, input circuit 140 may include any of a keypad, a dome switch, a touch pad, a jog wheel, and a jog switch, but is not limited thereto. Further, input circuit 140 may include several hardware key buttons. The hardware key buttons may include a hold key and a volume control button. For example, input circuit 140 may receive various user inputs i) for subscribing a bidirectional communication service, ii) for registering second devices for the bidirectional communication service, and iii) for controlling and managing the bidirectional communication for each registered second device.

Furthermore, UE 100 may include a touch screen panel (not shown) as another input unit for receiving touch inputs in accordance with at least one embodiment. The touch screen panel (not shown) may be disposed on an upper surface of display, but the embodiments are not limited thereto.

Output circuit 150 may include a display panel and a circuit for controlling the display panel for visually outputting information processed by processing circuit 120. For example, display of output circuit 150 may be a liquid crystal display (LCD) panel, light emitting diode (LED) panel, organic light emitting diode (OLED) pane, or an active-matrix organic light-emitting diode (AMOLED) panel, but the present invention is not limited thereto.

Display of output circuit 150 may include a touchscreen panel that receives a user input that indicates or points single or multiple target objects in a displayed image frame in accordance with at least one embodiment. In this case, such a touchscreen panel may be coupled to and cooperate with input circuit 130.

In accordance with an embodiment display of output circuit 150 may display a graphs user interface that shows various information on second devices 400 and corresponding status of having the bidirectional communication service. The graphic user interface may be formed by executing a bidirectional communication service app installed in UE 100. Display of output circuit 150 may display i) second devices 400 currently connected to UE 100 but not yet setting up for the bidirectional communication service, ii) second devices 400 being connected to UE and communicating with other devices 500 through the bidirectional communication service, and iii) a current status of corresponding second device, such as a completion of bidirectional communication service or release from bidirectional communication service.

Figure 2B:
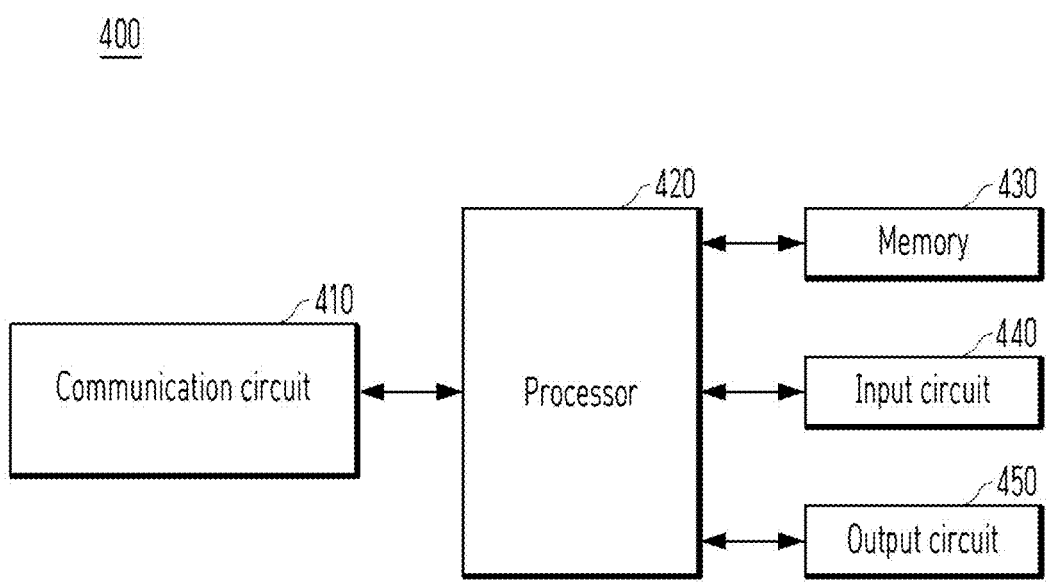
FIG. 2B is a block diagram illustrating a second device in accordance with an embodiment.

FIG. 2B is a block diagram illustrating a second device in accordance with an embodiment.

As described, second devices 400 may be devices that are only capable of directly communicating with UE 100 but incapable of bi-directly communicating with another device 500 on core network 200. Secondary devices 400 may be wearable devices, such as health care devices, smart glasses, smart watches, HDM devices, VR/AR supporting devices, which are connected to user equipment 100. However, the embodiments are not limited thereto. For example, second devices may be various IoT devices, such as devices in a smart factory, devices in a smart home, devices in a smart farm, and devices in a smart office.

Second devices 400 is not required to equip with a USIM in accordance with an embodiment. Without the USIM, bi-directional communication may be provided to second devices 400 by automatically setting up, authenticating, and managing IP addresses in accordance with an embodiment.

As shown in FIG. 2B, second device 400 may include communication circuit 410, processing circuit 420, memory 430, input circuit 440 and output circuit 450.

Communication circuit 410 may provide an access interface to be connected to UE 100 or a location area network (LAN). The access interface may be referred to as a connection interface or a communication interface. For this purpose, communication circuit 410 may include a short distance wireless communication interface for supporting a short wireless communication, such as Bluetooth or WiFi as well as a wired network connection interface, such as a USB port for supporting a wired communication such as USB, RJ45. Communication circuit 410 may transmit and receive data such as IP configuration information, IPv6 address, a router request message by communicating with user equipment 100 in accordance with an embodiment.

Processing circuit 420 may be a set of processor for performing or control overall operation of second device 400. For example, processing circuit 420 may be a central processing circuitry that controls constituent elements (e.g., memory, communication circuit, input/output circuit, etc.) of second device 400 and/or performs a variety of operations (or functions) of second device 400 for enabling bidirectional communication service for second device 400 by receiving IP configuration information and automatically setting up an IPv6 address based on the IP configuration information.

Memory 430 may store a variety of information, such as software programs for operation, data received from other entities, and data generated as result of operations. That is, memory 430 may store an operation system data, applications, and related data, received from other entities through a variety of communication media (e.g., communication networks). Memory 430 may include at least one of an internal memory and an external memory according to embodiments. For example, memory 130 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Input circuit 440 may be a user interface for receiving input from a user. For example, input circuit 140 may include any of a keypad, a dome switch, a touch pad, a jog wheel, and a jog switch, but is not limited thereto. Further, input circuit 140 may include several hardware key buttons. The hardware key buttons may include a hold key and a volume control button. For example, input circuit 140 may receive various user inputs i) for turning power on/off, ii) activating/deactivating the communication function, or iii) activating/deactivating a bidirectional communication service.

Output circuit 450 may include a display panel and a circuit for controlling the display panel for visually outputting information processed by processing circuit 420. For example, display of output circuit 150 may be a liquid crystal display (LCD) panel, light emitting diode (LED) panel, organic light emitting diode (OLED) pane, or an active-matrix organic light-emitting diode (AMOLED) panel, but the present invention is not limited thereto.

Display of output circuit 450 may include a touchscreen panel that receives a user input and coupled to and cooperate with input circuit 130.

As described, second device 400 denotes a device incapable of bidirectionally communicate with any devices on a public network. Second device 400 may establish a communication link (e.g, Bluetooth link or WiFi link) to UE 100 and communicate with UE 100 through the established communication link. However, second device 400 is incapable of bidirectionally communicate with other device on the public network without UE 100's intervention because second device 400 is not assigned with a public IP address. Hereinafter, a method of enabling the bidirectional communication for second device 400 will be described with reference to the accompanying drawings.

Figure 3:
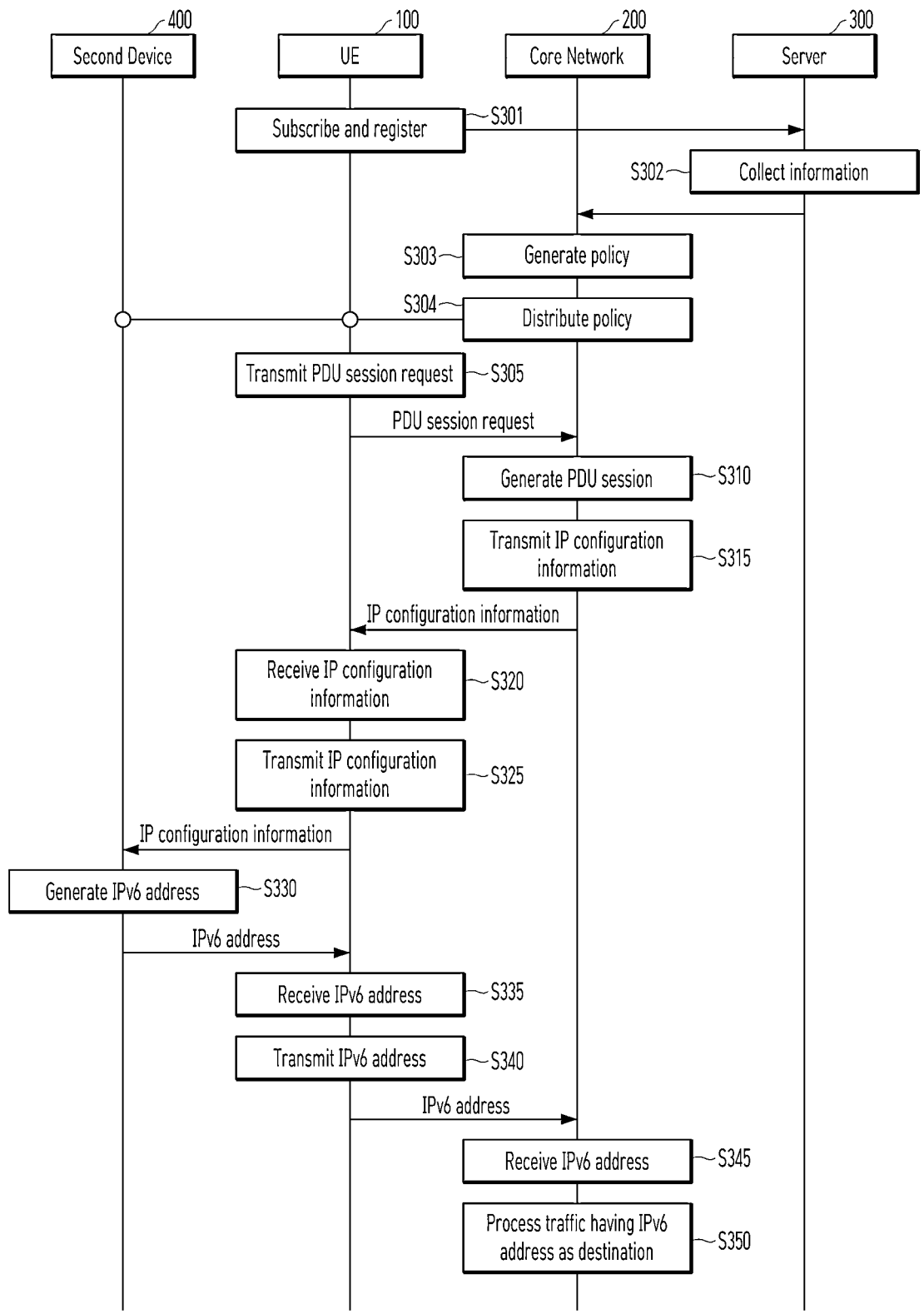
FIG. 3 is a flowchart illustrating a method of operating a second device access control system in accordance with one embodiment.

FIG. 3 is a flowchart illustrating a method of enabling a bidirectional communication of a second device in accordance with one embodiment.

Referring to FIG. 3, server 300 may receive a registration request or a subscription and registration request from user equipment 100 at step S301 and collect subscription and registration information from user equipment 100 and provide the collected subscription and registration information to core network 200 at step S302.

As described, server 300 may be a computer system of a service provider company that offers a service to enable a second device for bidirectional communication with other devices on a public network. Hereinafter, such a service is referred to as a bidirectional communication service. In order to provide the bidirectional communication service, server 300 may provide an application, a program, an app, and a web-site that allow users to subscribe for the bidirectional communication server and register second related devices 400 in accordance with an embodiment. For example, a user may download application, app, or software program on his/her devices, such as UE 100, install the downloaded app, and execute the installed application, app, or software programs. Such an executed app may provide a user interface (UI) for subscribing the bidirectional communication service and registering at least one of second devices 400. As another example, a user may access a designated web-site operated by server 300 and subscribe the bidirectional communication service and register at least one of second device 400 through the designated web-site. As further another example, a second device may be manufactured or produced to pre-registered for the bidirectional communication service and include a dedicated circuit or a pre-installed software program to communicate with server 300 through UE 100 to receive the bidirectional communication service.

Through the user interface provided by the executed application or the web-site, a user or a subscriber is allowed to subscribe the bidirectional communication service and register at least one of second devices 400 to have the bidirectional communication service. That is, the registered second device may be enabled to automatically generate an IPv6 address and communicate with other device on the public network using the generated IPv6 address in accordance with an embodiment.

Referring to back to FIG. 3, core network 200 may generate policy information using the received subscription and registration information at step S303 and distribute the generated policy information at least one of internal nodes of core network 200, user equipment 100, and second devices 400 at step S304.

In accordance with an embodiment, server 300 may deliver the collected subscription information to UDR and SCF of core network 200. Then, core network 200 (e.g., SCF) may generate a service policy and corresponding policy information based on the subscription and registration information.

In accordance with an embodiment, the policy information may be generated to include i) device management information, ii) hierarchical management information, iii) IP configuration information, and iv) naming rule information. Hereinafter, such policy information will be described in detail.

As described, core network 200 may generate policy information to include device management information using the subscription and registration information. The device management information may be generated for managing registered second devices and for authenticating second devices. For example, the device management information may include i) identification of a user equipment (e.g., telephone number), ii) a type of interface that a second device uses (e.g., WiFi, Bluetooth, USB, RJ45) to communicate with UE 100, and iii) identification of the second device (e.g., a host number of a second device, media access control (MAC) information of a second device, identification (ID) of a processor in a second device, which automatically sets up an IPv6 address). In addition, the device management information may include iv) authentication information which is the status of authentication verification. Herein, the status of authentication verification may mean whether the second device requires authentication to be allowed access to the core network.

Core network 200 may determine whether to allow accessing a second device by comparing a) the device management information with b) authentication information which is received from user equipment 100 when user equipment 100 accesses (e.g., register) a second device. Table 1 below shows the device management information according to an embodiment.

TABLE 1

| Group ID | Cell No. | Interface type | Host name | 2nd device MAC address | Authenticated? |
|---|---|---|---|---|---|
| MASS_USER | 010-7777-333 | Bluetooth | HOST_A | 83-67-FF-90-84-3C | Y |
|  |  | Wi-Fi | HOST_B | AB-AE-21-23-41-EA | Y |
| Group_A | 010-1234-5678 | Bluetooth | HOST_C | CE-1E-35-02-89-B8 | N |
|  | 010-2345-4123 | Wi-Fi | HOST_D | 34-67-22-11-00-77 | Y |
|  | 010-7891-0001 | USB | HOST_E | 55-6E-98-55-21-AA | N |
|  | ... | ... | ... | ... | ... |
| Group_B | 010-3412-1211 | RJ45 | HOST_F | BB-E5-12-63-41-BB | N |
|  |  | Bluetooth | HOST_G | CB-D1-73-28-9F-CC | N |
|  | 010-7989-1920 | Bluetooth | HOST_H | DA-9E-10-23-F5-DD | N |
| ... | ... | ... | ... | ... |  |

Furthermore, the policy information may be generated to include hierarchical management information for hierarchically generating and managing an IPv6 address of a second device. The hierarchical management information may define items for hierarchizing the IPv6 address for efficient routing processing of traffic destined for the second device. The hierarchical management information may include items and item values necessary for hierarchical management.

The items may include i) IPv6 prefix information determined based on a network design policy of a communication service provider, ii) a length (in bits) of IPv6 Prefix, iii) a type of service for a second device, iv) the type of a service charge schedule (e.g., tariff), and v) packet data network (PDN) information (e.g., internet, tethering, etc.) to which the second device will be connected. Additionally, the hierarchical management information may include vi) pool information of IPv6 prefix to be used for the second devices.

The hierarchical management information may be distributed to core network 200 and UE 100. Based on the hierarchical management information, core network 200, UE 100, and second device 400 may generate an IPv6 address for second devices. Table 2 below shows an example of the hierarchical management information in accordance with an embodiment.

figuring an IPv6 address of a second device in accordance with an embodiment. The IP configuration information may include items and item value, which are defined for automatically configuring an IPv6 address of a second device. According to an embodiment, the IP configuration information may include i) identification number of UE to which a second device is connected (for example, a phone number), a interface type of UE that is connected to a second device (such as WiFi, Bluetooth, USB, RJ45, etc.), address generation rules, and PDN (Packet Data Network) information to which a second device will be connected (for example, internet, tethering, etc.). The IP configuration information may be distributed to internal nodes of core network 200. Core network 200 may reference the IP configuration information to create configuration data for automatically configuring an IPv6 address of a second device and then transmit the created configuration data to UE 100. For example, table 3 below shows the IP configuration management information in accordance with an embodiment.

TABLE 2

| IP Prefix info | Prefix length | Service type | Rate Plan | PDN info |
|---|---|---|---|---|
| 2001:0DB8:3C4D | 48 | 0 | 5G_SLIM(0) | internet(0) |
|  |  | 0 | 5G_UNLIMIT(1) | tethering(1) |
|  |  | 1 | 5G_UNLIMIT(1) | internet(0) |
| 2001:0DB8:3C4F | 48 | 4 | 5G_BUSINESS(2) | p5g_tethering(3) |
| 2001:0DB8:3C450 | 48 | 3 | 5G_UNLIMIT(1) | internet(0) |
| ... | ... | ... | ... | ... |

The policy information may be generated to further include IP configuration information for automatically con-

TABLE 3

| Group ID | Cell No. | Allowed Interface | Address generation rule | PDN info |
|---|---|---|---|---|
| MASS_A | 010-7777-333 | WiFI Boluetooth USB RJ45 | Auto-generate Pseudo Random (12) | internet(0) |
| Group_A | 010-1234-5678 | WiFI Bluetooth | KT generation type (0) | tethering(1) |
|  | 010-2345-4123 | WiFI | KT generation type (1) | internet(0) |
|  | 010-7891-0001 | USB | 10 | P4g_internet(2) |
| ... | ... | ... | ... | ... |

In addition, the policy information may be generated to include naming rule information for configuring user interface (UI) elements on UE 100. The naming rule information may include items and item values of UI elements provided to a user when a service application is executed on UE 100. The naming tool information may include a name of a second device, an interface name used by a second device to communicate with UE, an interface type (e.g., WiFi, Bluetooth, USB, RJ45), usage state of bidirectional communication service. Such naming rule information may be distributed to UE 100. Table 4 below shows the naming rule information in accordance with an embodiment.

TABLE 4

| Device name | Interface name | Access type | Use? |
|---|---|---|---|
| SM-G981N | swlan0 | WiFi | Y |
| | btlan0 | Bluetooth | Y |
| | ublan0 | USB | N |
| | wrlan0 | RJ45 | N |
| ... | ... | ... | ... |
| A2482 | awlan0 | WiFi | Y |
| | abtlan0 | Bluetooth | Y |
| | aublan0 | USB | N |
| | awrlan0 | RJ45 | N |
| | ... | ... | ... |

As described above, server 300 (or SCF) may generate policy information including device management information, hierarchical management information, IP configuration information, naming rule information using the received subscription and registration information and distribute the generated policy information to at least one of internal nodes of core network 300, user equipment 100, and second devices 400 at step S304.

After distribution, a predetermined triggering event may be occurred to invoke the bidirectional communication service. Such a predetermined event may be i) initiation of registered second device, ii) user input to UE to activate a bidirectional communication service for a predetermined second device, iii) a predetermined message from another device on a public network to invoke a bidirectional communication service, iv) initiate communication circuit in UE 100, and v) initiate communication circuit in second device 400. However, the embodiments are not limited thereto. Any event may be defined as the triggering event for initiating the bidirectional communication service.

In accordance with an embodiment, to enable designated second device 400 to have the bidirectional communication service, UE 100 may transmit a packet data unit (PDU) session request to core network 200 upon the generation of the predetermined triggering event at step S305.

Then, core network 200 receives the PDU session request from UE 100 and generates a PDU session at step S310. Core network 200 transmits, to UE 100, IP configuration information for automatically configuring an IPv6 address of second device at step S315.

UE 100 receives the IP configuration information from core network 200 at step S320, and UE 100 transmits the IP configuration information to the second device 400 at step S325.

Second device 400 receives the IP configuration information, generates an IPv6 address based on the IP configuration information, and transmit the generated IPv6 address to UE 100 at step S330.

UE 100 receives the IPv6 address of second device 400 at step S335 and transmits the IPv6 address of second device 400 to core network 200 at step S340. Core network 200 receives the IPv6 address of second device 400 and process traffics destinated to second device 400, which has the IPv6 address as a destination address, using the IPv6 address thereof at step S350.

As described, core network 200 may provide IP configuration information to second device 400 through UE 100, and second device 400 may generate an IPv6 address thereof based on the provided IP configuration information in accordance with an embodiment. Since second device 400 is assigned with the IPv6 address, another device (e.g., foreign device) 500 on the public network may be able to bidirectionally communicate with second device 400 using the IPv6 address of second device 400 according to an embodiment.

Figure 4:
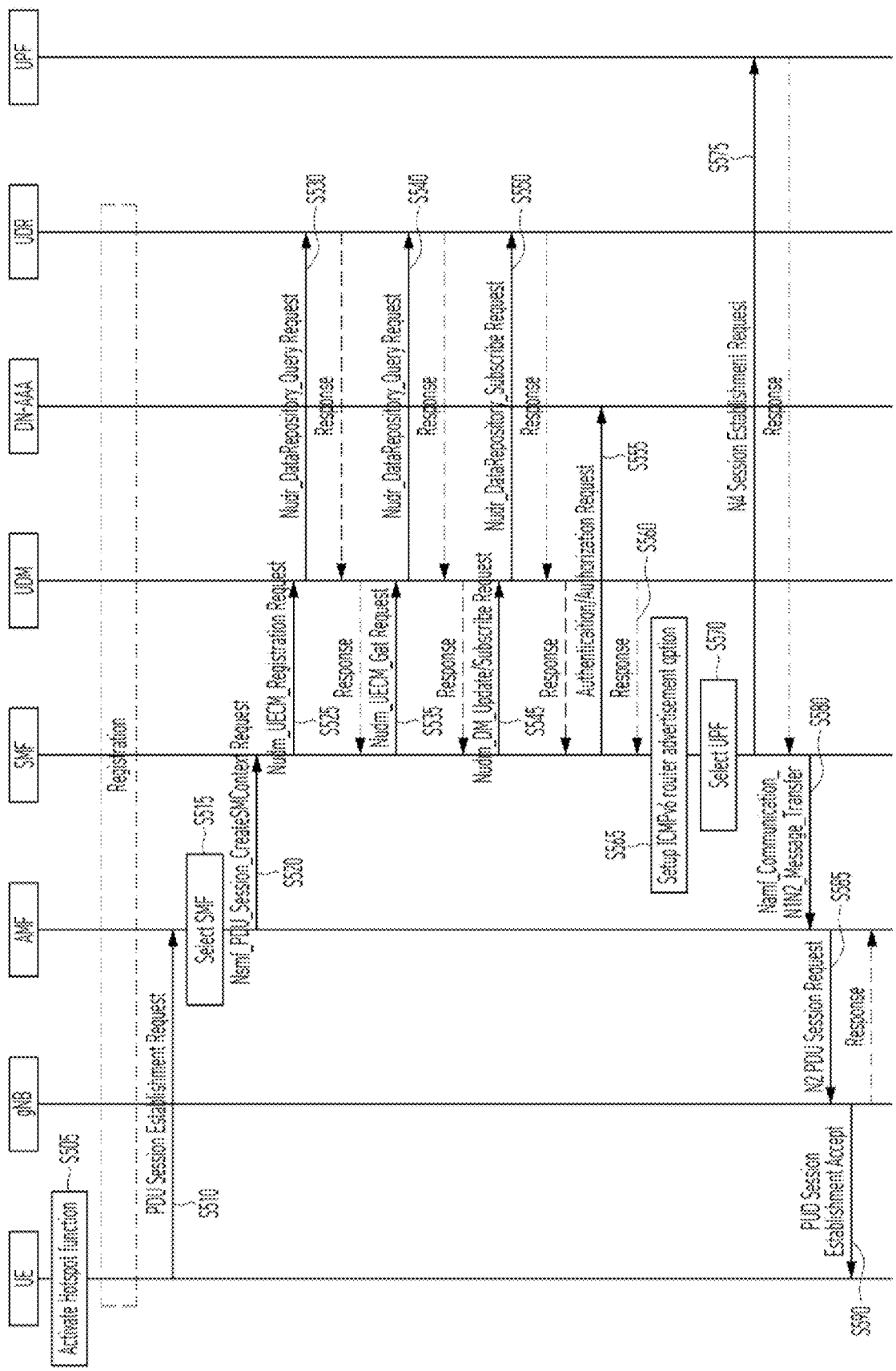
FIG. 4 is a flowchart illustrating operations for establishing a packet data unit (PDU) session between a user plane function (UPF) and a user equipment in accordance with at least one embodiment.

Hereinafter, the PDU session request and generation operation at S305 and 310 will be described in more detail with reference to FIG. 4. FIG. 4 is a flowchart illustrating operations for establishing a packet data unit (PDU) session between user plane function (UPF) of a core network and a user equipment in accordance with at least one embodiment.

Referring to FIG. 4, the PDU session may be established for the bidirectional communication of second device 400 in accordance with an embodiment. In particular, a tunnel for a voice communication of UE 100 and a tunnel for a data communication for UE 100 are already established before requesting the PDU session for second device at step S305. Additionally, core network 200 may establish a PDU session for second device 400 in order to generate a GTP-U tunnel (General Packet Radio Service (GPRS) Tunneling Protocol) used for bidirectional communication of second device 400 in accordance with an embodiment. That is, if UE 100 and core network 200 may support 5G and if UE 100 activates a hotspot function, the PDU session for the bidirectional communication of second device 400 may be further established in accordance with an embodiment.

UE 100 may determine whether any triggering event is occurred. For example, UE 100 may determine whether the hotspot function is activated or not. Such operation may be a triggering event for initiating the bidirectional communication service for second device 400. Upon the determination that the hotspot function is activated, the PDU session is established. As described, the triggering event may further include receiving a predetermined input from a user, such as an input to activate the bidirectional communication service.

Referring to FIG. 4, UE may determine that the hotspot function is activated at step S505 and transmits a PDU session establishment request to core network 200, such as access and mobility management function (AMF) at step S510 (or S305).

Upon the receipt of the PDU session establishment request, core network 200 may establish the PDU session for bidirectional communication of second device at step S310. In particular, core network 200, according to a related standard specification, performs operations for establishing the PDU session. For example, AMF performs SMF selection for allocating SMF for managing the PDU session at step S515. AMF transmits Nsaf_PDUsession_CreateSM-Context request to SMF selected through SMF selection at step S520. The SMF may perform operations such as registration request, repository request, subscription request with UDM and UDR at steps S525, S535, S540, S545, and S550.

Meanwhile, 3GPP standard defines that SMF additionally requests DN-AAA to perform authentication and to provide necessary information when PDU session establishment. Accordingly, SMF transmits authentication/authorization request to DN-AAA at step S555.

In accordance with an embodiment, DN-AAA may already have (e.g., own) the policy information (e.g., including IP configuration information) received from at least one of SCF and server 300. When DN-AAA receives the authentication/authorization request, DN-AAA transmits the policy information to SMF as a response for authentication/authorization request at step S560.

In accordance with an embodiment, DN-AAA may transmit IP configuration information to SMF. SMF may use the received IP configuration information from DN-AAA to generate an ICMPv6 router advertisement message for delivering IP configuration information. Then, SMF may transmit the generated ICMPv6 router advertisement message to UE 100. That is, DM-AAA may transmit the IP configuration information to SMF to be inserted in option fields of the ICMPv6 router advertisement message. The IP configuration information transmitted from DN-AAA to SMF may include information on support interface types for supporting bidirectional communication service, address generation rule, and PDN information.

In accordance with an embodiment, a RADIUS (Remote Authentication Dial-In User Server) message may be used to transmit the IP configuration information from DN-AAA to SMF. FIG. 5 illustrates such a RADIUS message that is transmitted to a session management function (SMF) from a data network authentication, authorization, and accounting (DN-AAA) system in accordance with an embodiment.

Various message integration protocols may be used as a message integration protocol between SMF and DN-AAA. Among them, diameter or RADIUS protocols are often used. In accordance with an embodiment, a RADIUS protocol is used to transmit a message between SMF and DN-AAA. However, the embodiments are not limited thereto.

As shown in FIG. 5, the RADIUS message may include information on support interface, address generating rule, and PDN information in a reserved field according to an embodiment. That is, DN-AAA may insert IP configuration information, such as support interface, address generation rule, and PDN information in reserve fields in the RADIUS message and transmit the RADIUS message to SMF.

The RADIUS message includes a reserved field (e.g., user customized field, user defined field). In accordance with an embodiment, DN-AAA inserts the IP configuration information in the reserved field additionally and delivers the information to SMF. Such information may include support interface, address generation rule, and PDN information.

As shown in FIG. 5, the RADIUS message includes a vendor-data field. Such a vendor-data filed may be divided into three parts, a support interface field (8 bits), an address generation rule field (8 bits), and a PDN information field (16 bits). DN-AAA may use this vendor-data field (e.g., reserve field) to insert corresponding information in each field and deliver the RADIUS message to SMF in accordance with an embodiment.

As described, the RADIUS message already defined in 3GPP standards is used to deliver necessary information for the automatic configuration of the IPv6 address, is conveyed. Therefore, there is an advantage in being able to implement bidirectional communication services for the second device while minimizing changes to the existing system.

SMF receives the IP configuration information in the RADIUS message, and SMF sets up option fields of the ICMPv6 router advertisement message to include the IP configuration information at step S560 and selects UPF at step S570.

Then, SMF may transmit the PDU session establishment request to UPF at step S575, and UPF sends the response thereof to SMF at step S575. Then, core network 200 may a PDU session establishment accept message to UE 100 at steps S580, S585, and S590.

As described, during establishing the PDU session for second device 400, DN-AAA provides the IP configuration information to SMF as a response to authentication/authorization request, and SMF sets up the option fields of the ICMPv6 router advertisement message by inserting IP configuration information in the ICMPv6 router inform message in accordance with an embodiment.

That is, core network 200 may collect the subscription and registration information on second device 400 from server 300 through UE 100 and generate the policy information including IP configuration information during establishing the PDU session for second device 400. The IP configuration information may be transmitted from core network 200 to UE 100 and second device 400 in order to enable second device 400 to automatically generate a public IP address itself in accordance with an embodiment. Hereinafter, such operation for transmitting the IP configuration information to second device 400 and generating the public IP address (S315 to S340) will be described in more detail with reference to FIG. 6 to FIG. 8.

Typically, a dynamic host configuration protocol (DHCP) server manages a range of public IP addresses and assigns public IP addresses to devices. However, UE 100 does not support legacy type network function. Therefore, it is impossible to assign a public IP address to second device 400 through the DHCP server. That is, second device 400 is not capable of communicating with a DHCP server, so second devices 400 cannot obtain a public IP address from the DHCP server. Therefore, second device 400 may automatically generate a public IP address (e.g., IPv6 address) by receiving necessary information from core network 200 through UE 100 in accordance with an embodiment.

Figure 6:
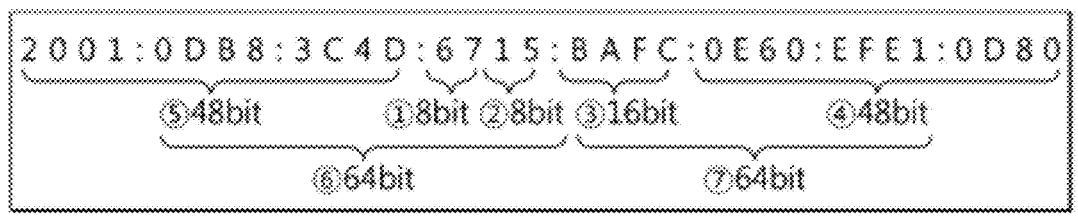
FIG. 6 is a diagram for explaining an IPv6 address of a second device in accordance with an embodiment.

For this purpose, Internet Protocol Version 6 (IPv6) is used to configure a public IP address for second device 400 because IPv6 allows automatic IP address configuration. FIG. 6 is a diagram for explaining an IPv6 address of a second device in accordance with an embodiment.

IPv6 defines i) the first 64 bits (as shown in FIG. 6, ⑥) as an area that a service provider could configures and ii) the last 64 bits (as shown in FIG. 6, ⑦) as an auto-configuration area. The first 64 bits (as shown in FIG. 6, ⑥) are referred to as the Prefix area, and the last 64 bits (as shown in FIG. 6, ⑦) are referred to as the auto-configuration area.

In accordance with an embodiment, the Prefix area includes 64 bits set by core network 200, and the auto-configuration area may include 64 bits set by second device 400. For example, core network 200 may configure the first 64 bits (as shown in FIG. 6, ⑥) according to network policies and second device 400 may configure the last 64 bits (as shown in FIG. 6, ⑦).

As described, the IPv6 address is generated by second device 400 by receiving IP configuration information from core network 200 through UE 100 in accordance with an embodiment. For example, core network 200 may transmit IP configuration information to UE 100. The IP configuration information may include IPv6 Prefix and address generation rules. That is, core network 200 may generate IPv6 Prefix to be inserted into the Prefix area (C) in FIG. 6) based on the network policy, include it in the IP configuration information, and provide it to second device 400.

Further, the IP configuration information may include the address generation rule for second device 400 to complete the auto-configuration area (FIG. 6 in ⑦). Second device 400 may generate the IPv6 address of the second device by using the IPv6 Prefix and converting the identification information of second device 400 based on address generation rules in accordance with an embodiment.

As described, core network 200 may generate 48 bits of the Prefix area (for example, bits 1 to 48 (⑤ in FIG. 6)) according to the network provider's network design policy and provide it to second device 200. For efficient data packet routing in a wireless network, core network 200 may generate the IPv6 Prefix to include hierarchical management information for managing the IPv6 address of the second device.

Specifically, core network 200 may generate the IPv6 Prefix based on hierarchical management information, which includes a service type for second device 400 and a service charge rate plan applied to second device 400.

For instance, core network 200 configures 8 bits from the Prefix area to represent the service type to which second device 400 is subscribed. In other words, bits 49 to 56 of the Prefix area are set to one of the values: 0, 1, 2, or 3, as shown in FIG. 6 (①). If the value is 0, it represents the eMBB service; 1 represents the URLLC service; 2 indicates the MIoT service; and 3 stands for the V2X service.

Additionally, the next 8 bits of the Prefix area can be configured to represent the service charge rate plan applied to the second device. For example, bits 57 to 64 of the Prefix area can be set to one of the values: 0, 1, or 2. A value of 0 indicates the 5G SLIM rate plan; 1 denotes the 5G UNLIMIT rate plan; and 2 signifies the 5G BUSINESS rate plan. (② in FIG. 6)

Hierarchical management information may be inserted not only in the Prefix area but also in the auto-configuration area. For instance, a value corresponding to PDN information to which second device 400 may be inserted into 16 bits of the auto-configuration area (③ in FIG. 6). Since the auto-configuration area is generated by second device 400, core network 200 may include information on a packet data network that second device 400 to be connected to (e.g., PDN information) to the IP configuration information and send it to second device 400. For example, the PDN information may be one of the values: 0, 1, 2, or 3. If the value is 0, it indicates "internet"; if it's 1, "tethering"; if it's 2, "p5g_internet"; and if it's 3, "p5g_tethering". The second device can complete the 16 bits (e.g., 1st to 16th bit shown as ③ in FIG. 6) of the auto-configuration area based on the PDN information of the auto-configuration area.

As described above, the hierarchical management information is included in the IPV6 address of the second device. Besides this method, there are various other implementations possible: including it only in the Prefix area, including it only in the auto-configuration area, or including it in both the Prefix area and the auto-configuration area.

In accordance with an embodiment, 48 bits of the auto-configuration area (for example, bits 17 to 64) may be configured by second device 400 referencing its own identification information. Details related to this will be explained further in the future.

In summary, core network 200 may transmit IP configuration information to second device 400 through UE 100 for enabling second device 400 to automatically configure an IPv6 address. The IP configuration information may include the IPv6 Prefix that will be inserted into the Prefix area of the IPv6 address, which is generated by the core network 200.

Furthermore, the auto-configuration area of the IPv6 address is configured by second device 400. Core network 200 may include essential information (such as PDN information, address generation rules, etc.) to configure the auto-configuration area in the IP configuration information and transmit it to second device 400 through UE 100.

Additionally, core network 200 may further include information on the types of interfaces (such as WiFi, Bluetooth, USB, RJ45, etc.) that support bidirectional communication services in the IP configuration information and transmit it to second device 400 through UE 100.

Figure 7:
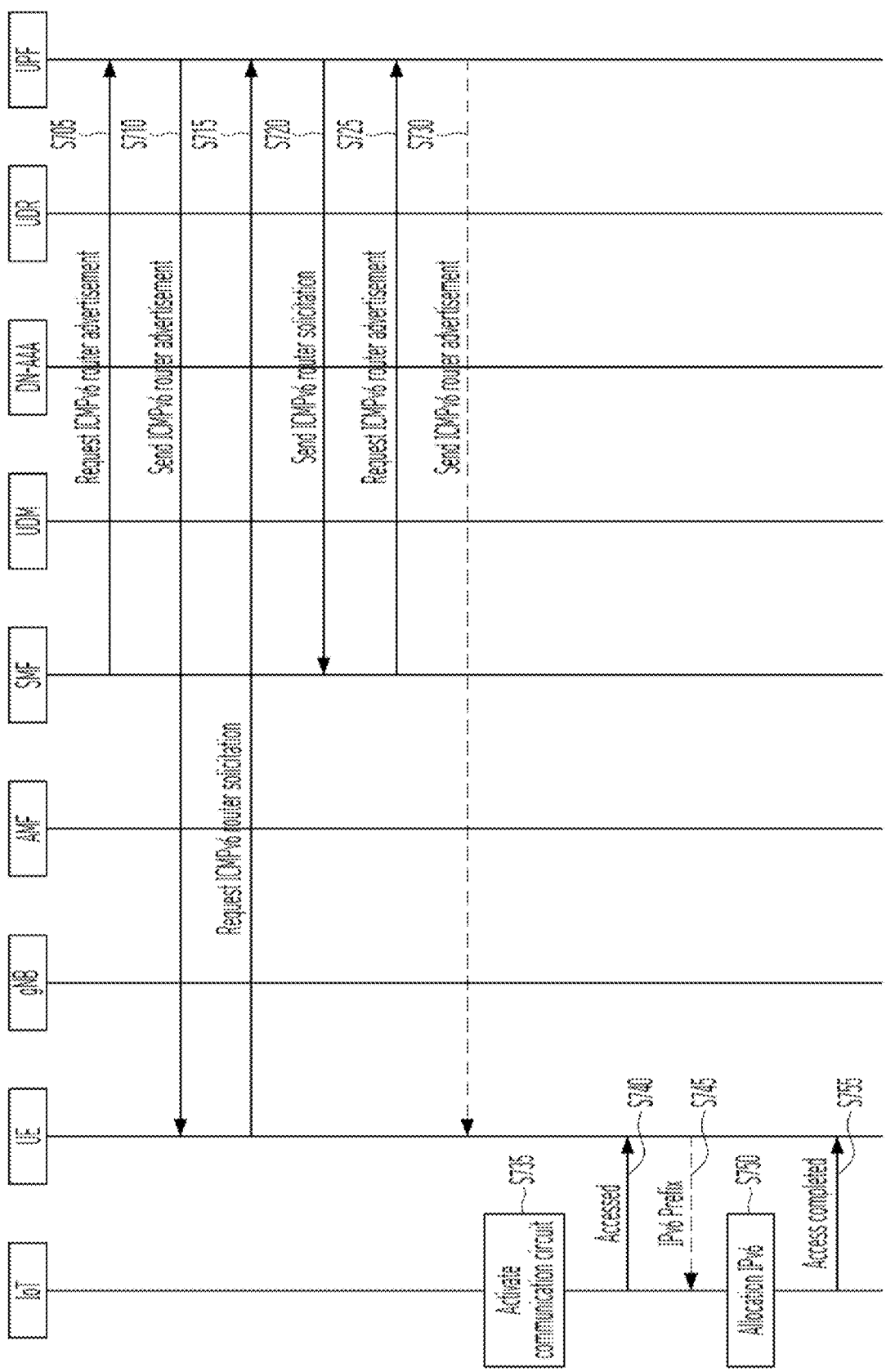
FIG. 7 is a diagram for explaining a method for automatically configuring an IPv6 address of a second device by delivering configuration information to a second device in accordance with an embodiment.

Hereinafter, an operation for delivering the IP configuration information to second device 400 and generate the IPv6 address by second device 400 based on the IP configuration information will be described with reference to FIG. 7. FIG. 7 is a diagram for explaining a method for automatically configuring an IPv6 address of a second device by delivering IP configuration information to a second device in accordance with an embodiment.

In accordance with an embodiment, Internet Control Message Protocol version 6 (ICMPv6) may be used to deliver IP configuration information to second device 400. ICMPv6 is Internet Control Massage Protocol implementation for IPv6.

Referring to FIG. 7, SMF transmits a request for an ICMPv6 router advertisement to UPF at step S705, and UPF transmits the ICMPv6 router advertisement to UE 100 through a GUT-U tunnel set to hotspot only at step S710. UE 100 may transmit ICMPv6 router solicitation for second device 400 to SMF through UPF at step S715 and S720. In this case, user equipment 100 transmits ICMPv6 router solicitation in form of an ICMPv6 message according to a related standard network integration specification.

If SMF receives the ICMPv6 router solicitation from UE 100, SMF may transmit IP configuration information to UE 100. That is, SMF includes the IP configuration information in a response ICMPv6 message in response to the ICMPv6 router solicitation and transmit the response ICMPv6 message to UE 100 through UPF at steps S725 and S730. The response ICMPv6 message may be referred to as ICMPv6 router advertisement message. That is, core network 200 may transmit the IP configuration information to UE 100 in a form of ICMPv6 message according to the standard network integral specification. Here, the IP configuration information may include information necessary for auto-matically configuring an IPv6 address, such as IPv6 prefix, address generation rule, PDN information, interface type supported for bidirectional communication, such as WiFi, Bluetooth, USB, RJ45.

When the ICMPv6 router solicitation message is received from UE 100 at step S715, UPF transmits the ICMPv6 router solicitation message to SMF at step S720. When the ICMPv6 router solicitation message is received, SMF may transmit the response ICMPv6 message to UE through UPF at steps S725 and S730.

FIG. 8 is a diagram illustrating an ICMPv6 router advertisement message transmitted to a user equipment by session management function (SMF).

SMF includes the IP configuration information in option fields in the ICMPv6 router advertisement message and transmits the ICMPv6 router advertisement message to UE 100. As shown in FIG. 8, the option fields of the message include information necessary for automatically configuring an IPv6 address (e.g., support interface, address generation rule, PDN information).

According to an embodiment, the IP configuration information may be distributed to UE 100 using the ICMPv6 router advertisement message according to the standard network integration specification. Therefore, it is possible to enable second device 400 to bidirectionally communicate with other device 500 on a public network while minimizing modification of the existing system.

Meanwhile, UE 100 may receive IP configuration information from core network at step S730 (e.g., S320). In this case, UE 100 may extract IP configuration information from the response ICMPv6 message (e.g., ICMPv6 router advertisement message) and store the extracted configuration information. Further, UE 100 may extract information to be acquired from the IP configuration information additionally. Such information may include link-layer address, MTU, support interface, etc.

UE 100 may transmit the IP configuration information to second device at step S325.

Second device 400 determines whether a communication function is activated or not. For example, the communication function denotes an operation that attempts to communicate with UE 100 by second device 400. For example, it may mean that Bluetooth or WiFi function of second device 400 is activated. When the communication function is activated at step S735, second device 400 may transmit the ICMPv6 router solicitation message to UE 100 at step S740.

When the ICMPv6 router solicitation message is received, UE 100 may transmit a response ICMPv6 message (e.g., ICMPv6 advertisement message) to second device 400 at step S745. The response ICMPv6 message may be referred to as the ICMPv6 advertisement message and includes IP configuration information containing IPv6 Prefix, address generation rule, and PDN information. Further, the response ICMPv6 message may further include DNS information and other information for bidirectional communication.

When the ICMPv6 router solicitation message is received, UE 100 may generate a response ICMPv6 message and transmit it to second device 400.

Figure 9:
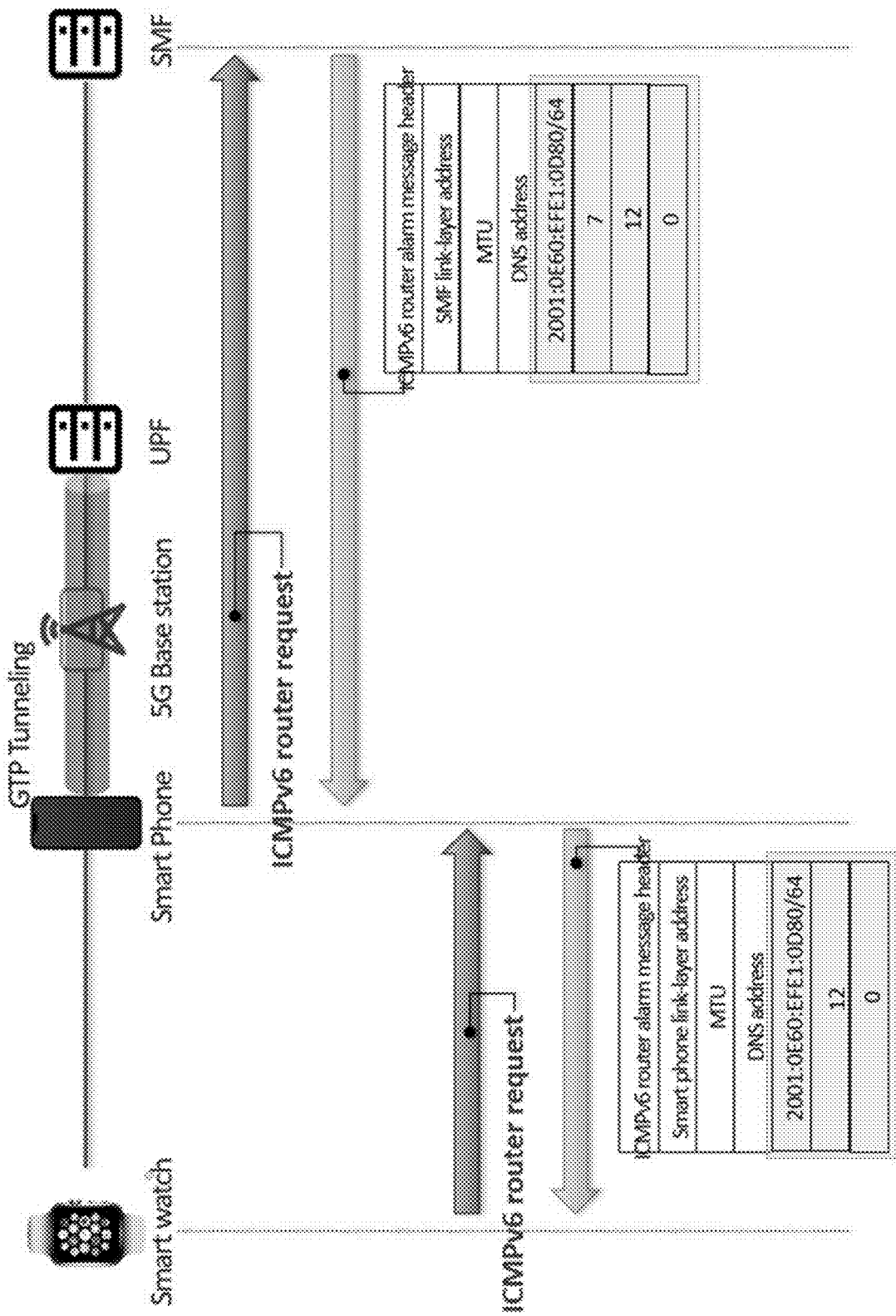
FIG. 9 is a diagram for illustrating a delivering procedure of a configuration information in accordance with an embodiment.

FIG. 9 is a diagram for illustrating an operation for delivering IP configuration information in accordance with an embodiment.

Referring to FIG. 9, UE 100 and UPF 210 are connected through GTP-U tunnel through base station 905. UE 100 may transmit the ICMPv6 router solicitation message to SMF 220 through UPF 210 at step S910.

SMF 220 may transmit the ICMPv6 router advertisement message including IP configuration information to UE 100 through UPF 210 at step S920. The IP configuration information may include link-layer address, MTU, DNS address, IPv6 Prefix (64 bits), support interface (e.g., 7=WiFi (0)+ Bluetooth (1)+USB (2)+RJ45 (4)), address generation rule (e.g., auto-generate Pseudo random (12)), and PDN information (e.g., internet (0)).

Further, when the communication function of second device 410 is activated, second device 410 transmits the ICMPv6 router solicitation message to UE 100 at step S930. In this case, UE 100 may transmit the ICMPv6 router advertisement message including IP configuration information to second device 310. The IP configuration information transmitted from UE 100 to second device 310 includes DNF address, IPv6 Prefix (64 bits), address generating rule (e.g., Auto-generate Pseudo Random (12)), and PDN information (e.g., Internet (0)).

Then, second device 410 receives the IP configuration information and automatically configures an IPv6 address for the second device at step S750 (e.g., 330).

In particular, second device 410 may generate an IPv6 address thereof using the IPv6 Prefix and identification information of the second device (e.g., a host name of second device, MAC address of second device, and ID of a processor in second device) based on the address generation rule. When the IP configuration information includes PDN information, second device 410 may use PDN information with IPv6 Prefix, identification information of second device to generate the IPv6 address thereof.

As described above, the Prefix area of the IPv6 address is already created by core network 200. Therefore, second device 410 may generate the address value in the auto configuration area using the identification information and PDN information according to the address generation rule.

The address generation rule may define a rule of converting identification of second device 400 to the address value in the auto configuration area. In particular, the address generation rule may include information how to arrange values forming the MAC address of the second device within the auto configuration area, how to convert and arrange values forming the MAC address. When the configuration information includes PDN information, the address generation rule may further include information that teaches how to arrange or to convert and arrange values corresponding to the PDN information.

As the address generation rule, auto-generate pseudo random rule may be used. However, the embodiments are not limited thereto. It is required that core network 200 must have the address generation rule that is provided to second device 400. When second device transmit an IPv6 address to core network 200, core network 200 may authenticate the IPv6 address using the address generation rule that core network 200 has.

FIG. 10 is a diagram illustrating two examples of automatically configuring an IPv6 address in accordance with an embodiment.

Diagrams (a) and (b) in FIG. 10 show examples of IPv6 addresses each generated by applying different address generation rules. The first 64 bits are the prefix area (2001: 0E60: EFE1:0D80) and generated by core network 200 as IPv6 Prefix. As shown, both prefix areas are identical. However, since different address generation rules are used, the next 64 bits which are the auto configuration area are different in the diagrams (a) and (b).

When the IPv6 address is generated, second device 400 transmits the generated IPv6 address to UE 100 at step S755.

Figure 11:
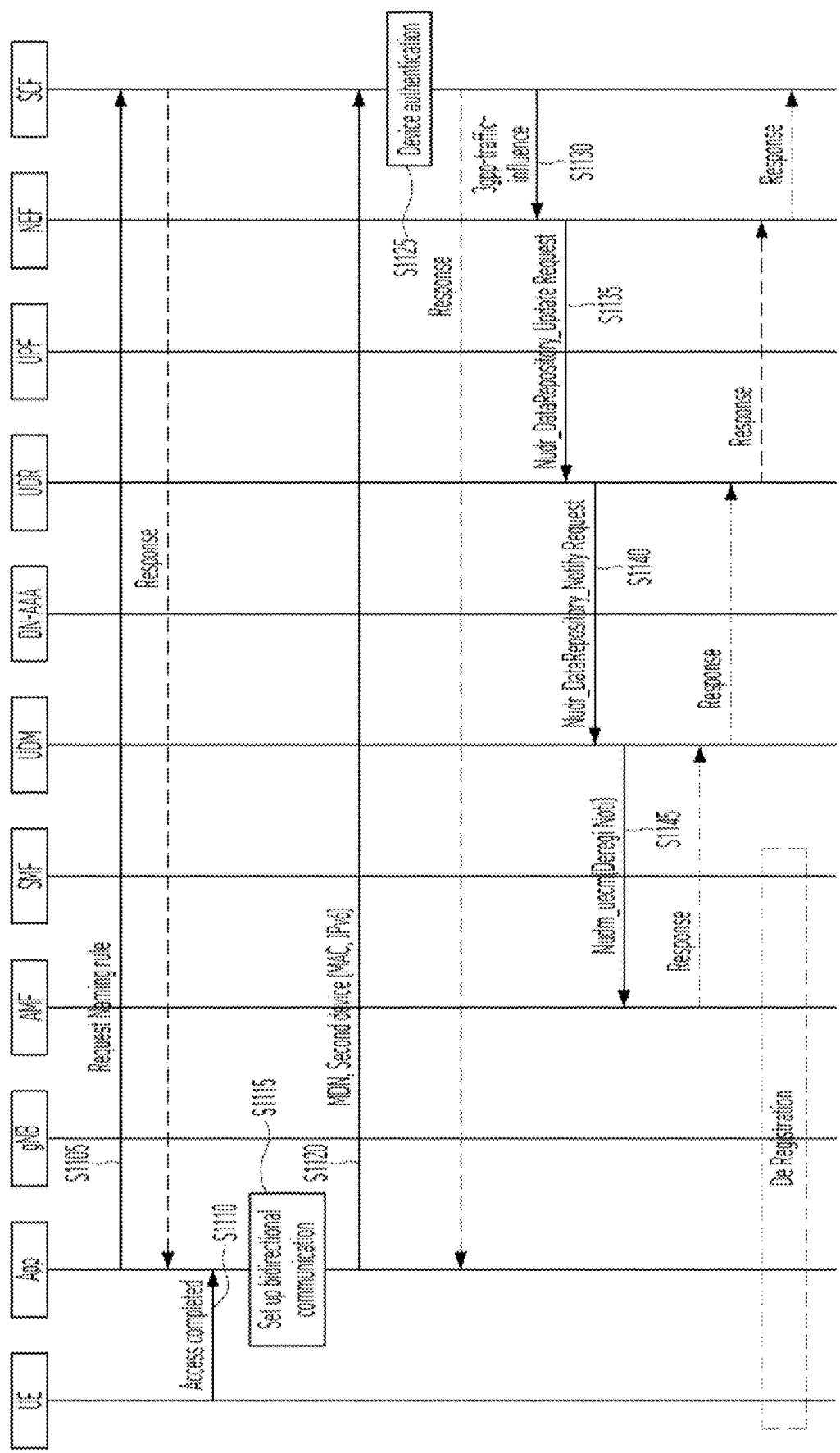
FIG. 11 is a diagram illustrating a method for authenticating an IPv6 address of a second device by setting up bi-directional communication of a second device in accordance with an embodiment.
Figure 12:
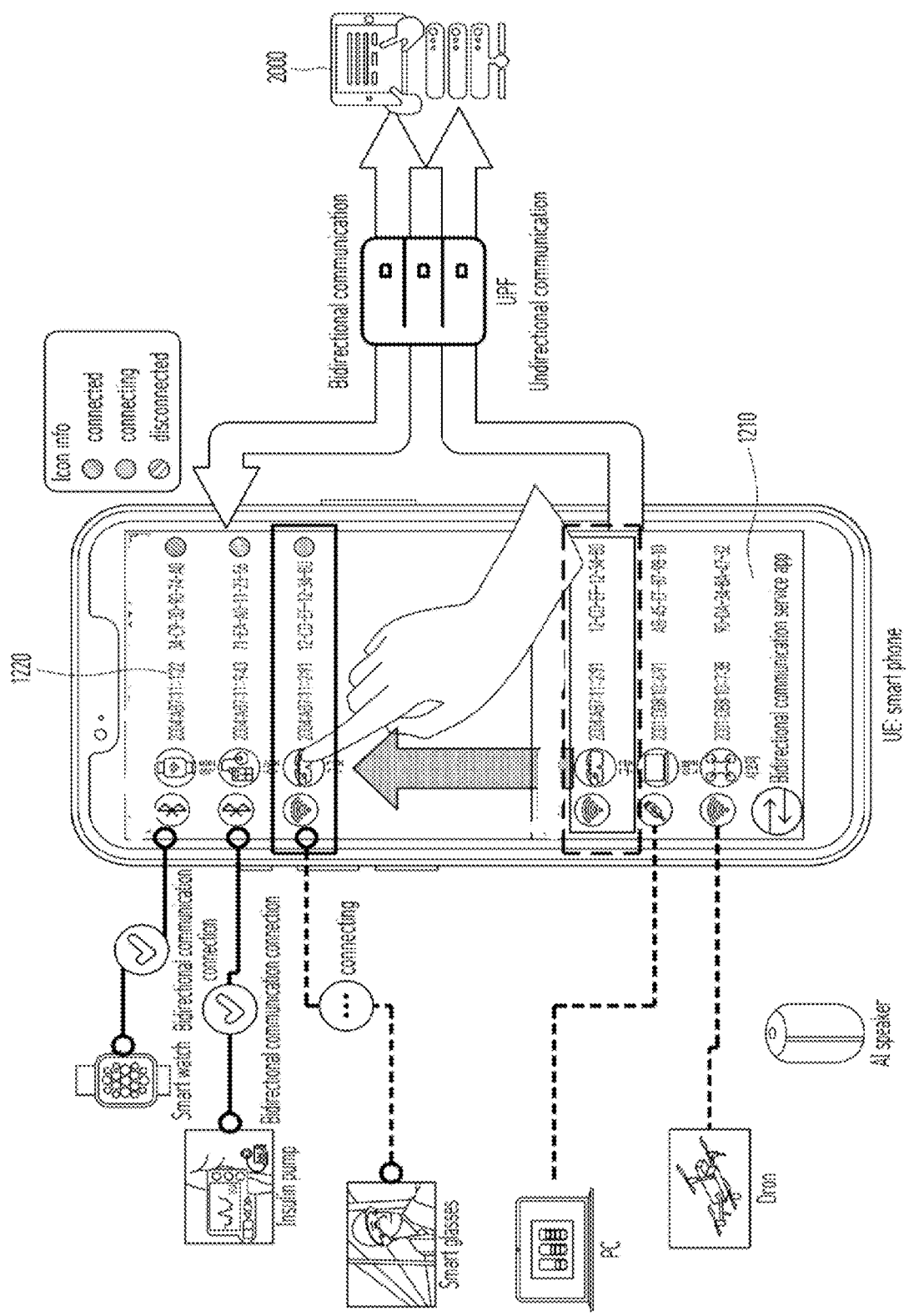
FIG. 12 is a diagram illustrating a user interface of a bi-directional communication setup app in accordance with an embodiment.

Hereinafter, a method for setting up bidirectional communication with second device and authenticating an IPv6 address of the second device will be described with reference to FIG. 11 and FIG. 12. FIG. 11 is a diagram illustrating a method for authenticating an IPv6 address of a second device by setting up bi-directional communication of a second device in accordance with an embodiment. FIG. 12 is a diagram illustrating a user interface of a bi-directional communication service app in accordance with an embodiment.

Referring to FIG. 12, a bidirectional communication service app may be an app for setting up bidirectional communication of UE 100. Hereinafter, the bidirectional communication service app is referred to as a service app. As described, such a service app is downloaded from server 300 and installed at UE 100. The service app may be executed in response to predetermined user inputs and provide a graphic user interface for enabling a user to subscribe the bidirectional communication service, register second devices 400, and manage the bidirectional communication of second devices 400. For example, FIG. 12 shows an example of the graphic user interface displayed on UE 100.

Such a service app may request naming rule information from SCF in order to form the user interface (UI) elements in a graphic user interface at step S1105. Such naming rule information may be included in the policy information which is generated by core network 200 based on the subscription and registration information from server 300. For example, the graphic user interface displays second devices that are currently connected to UE 100, IPv6 address, and MAC address thereof.

Referring to FIG. 12, the graphs user interface may show various information on second devices 400 and corresponding status of having the bidirectional communication service. For example, display area 1210 of the graphic user interface shows second devices 400 currently connected to UE 100 but not yet setting up for the bidirectional communication service. Further, display area 1210 of the graphic user interface shows second devices 400 being connected to UE and communicating with other devices 500 through the bidirectional communication service. Furthermore, the graphic user interface may display a current status of corresponding second device, such as a completion of bidirectional communication service or release from bidirectional communication service. Bidirectional service app may display a status of a second device, such as a connection completed/being accessed/connection released.

Referring back to FIG. 11, when second device 400 connects to UE 100 and transmits an IPv6 address, UE may display the status of second device 400 as connection completed and provide options for setting up the bidirectional communication service of second device 400 to users through the graphic user interface of the service app at step S1110. The graphic user interface of the service app may receive user inputs for setting up the bidirectional communication service to second device 400 at step S1115.

Then, UE 100 determines that the setup of the bidirectional communication service of second device 400 is completed and transmits the IPv6 address of the second device to core network 200 at step S340.

When bidirectional communication service is not set up, UE 100 (e.g, service app) may not transmit the IPv6 address of second device 400 to core network 200. In this case, one way communication service is only provided to a corresponding second device.

UE 100 may transmit authentication information to SCF at step S1120. The authentication may include additional information for bidirectional communication, such as MAC address or MDN)

SCF may receive the IPv6 address of the second device from UE 100 at step S345. SCF may authenticate the second device using i) the information stored in core network 200, such as an address generation rule and an identification information of the second device, and ii) the received IPv6 address at step S1125.

In particular, SCF may verify whether the IPv6 address of second device 400 is generated i) based on the previously registered identification information of the second device and ii) based on an address generation rule provided to second device 400. In addition, SCF may verify whether the IPv6 address of second device 400 is generated based on IPv6 Prefix and PDN information provided to second device 400. After completing the verification, SCF may determine that second device 400 is authenticated.

After competing the authentication, SCF transmits the IPv6 address of second device 400 to UDR through NEF and UDR updates a corresponding subscriber profile based on the IPv6 address of second device 400 at steps S1130 and S1135. Core network 200 may distribute the IPv6 address and a corresponding policy for processing traffic related to the IPv6 address to internal nodes at step S1140 and S1145.

Figure 13:
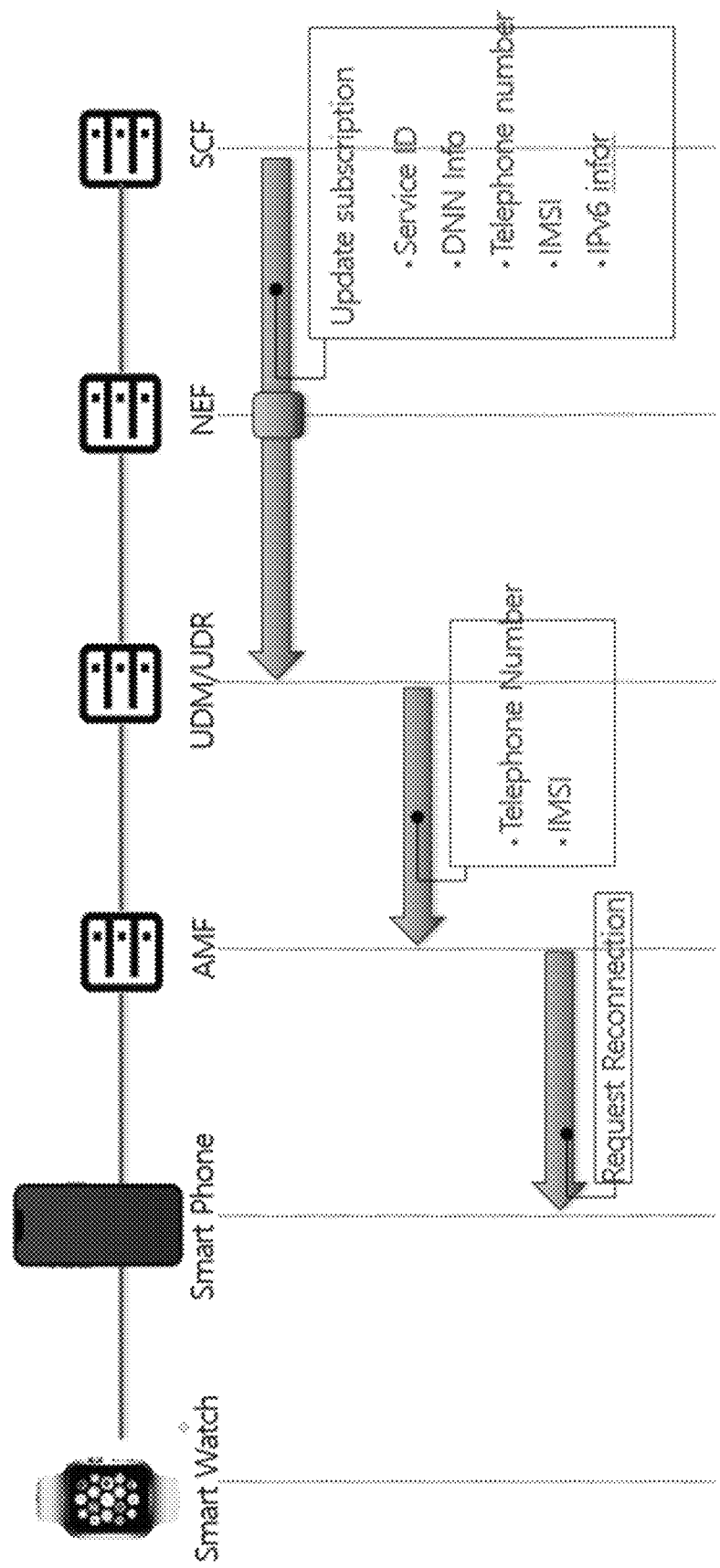
FIG. 13 is a diagram for explaining a policy changing procedure in accordance with an embodiment.

FIG. 13 is a diagram explaining operations performed when a service policy is changed or updated in accordance with an embodiment.

When subscription information is updated or when the policy is changed, SCF 260 may update new subscription information or a new policy at UDR/UDM 240 through NEF 250. In this case, UDR/UDM 240 may transmit a UE reconnection request including a telephone number and IMSI to AMF 230. AMF 230 may transmit a UE reconnection request to UE 100. Further, core network 200, UE 100, and second device 400 may perform operations of S305 to S345 again.

Meanwhile, after completing the authentication of second device 400, core network 200 is able to process traffic generated by second device 400 or delivered to second device 400 as a destination. Such operation will be described with reference to FIG. 14 and FIG. 15.

Figure 14:
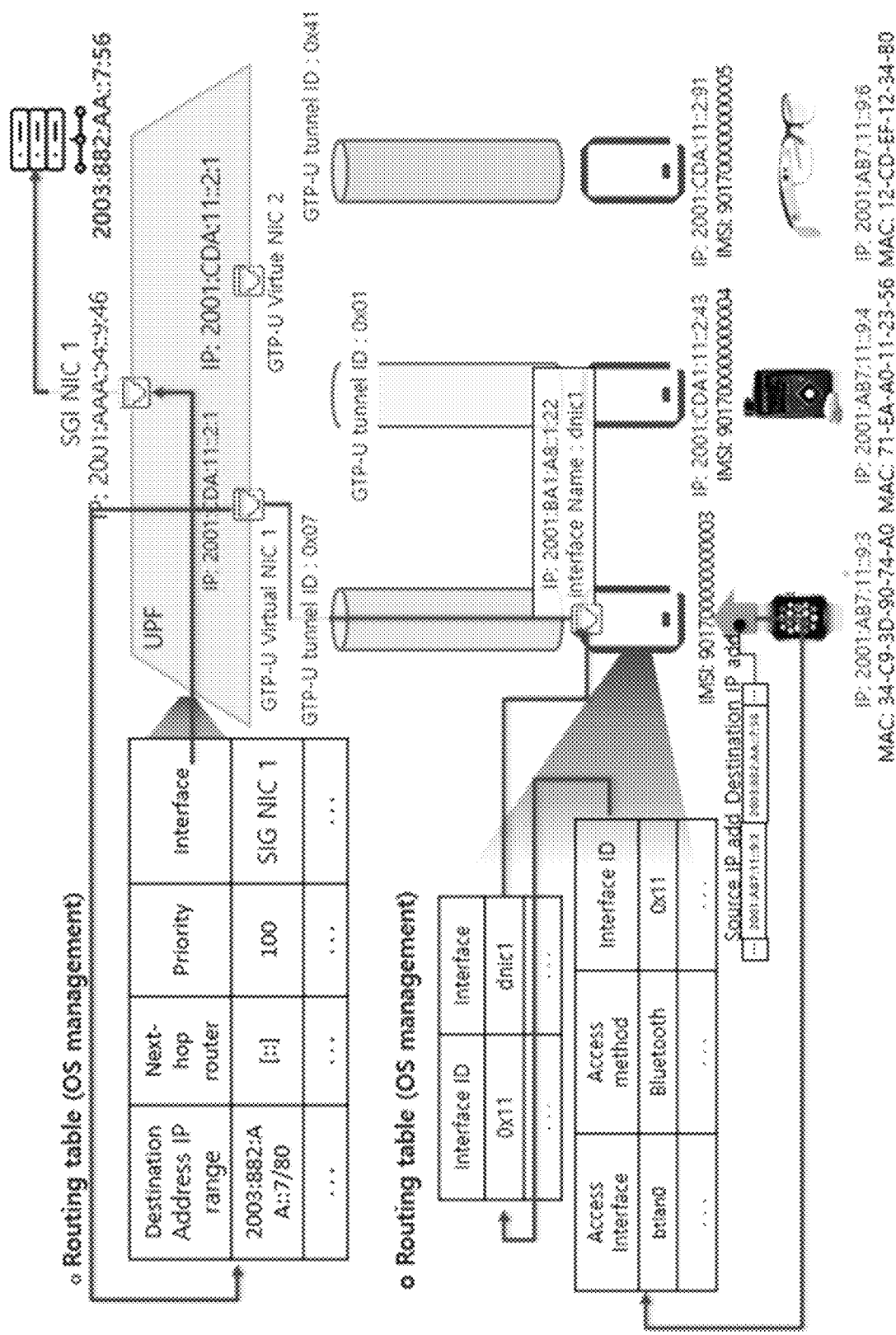
FIG. 14 is a diagram for explaining an operation for transmitting traffic from a second device to an external device in accordance with an embodiment.
Figure 15:
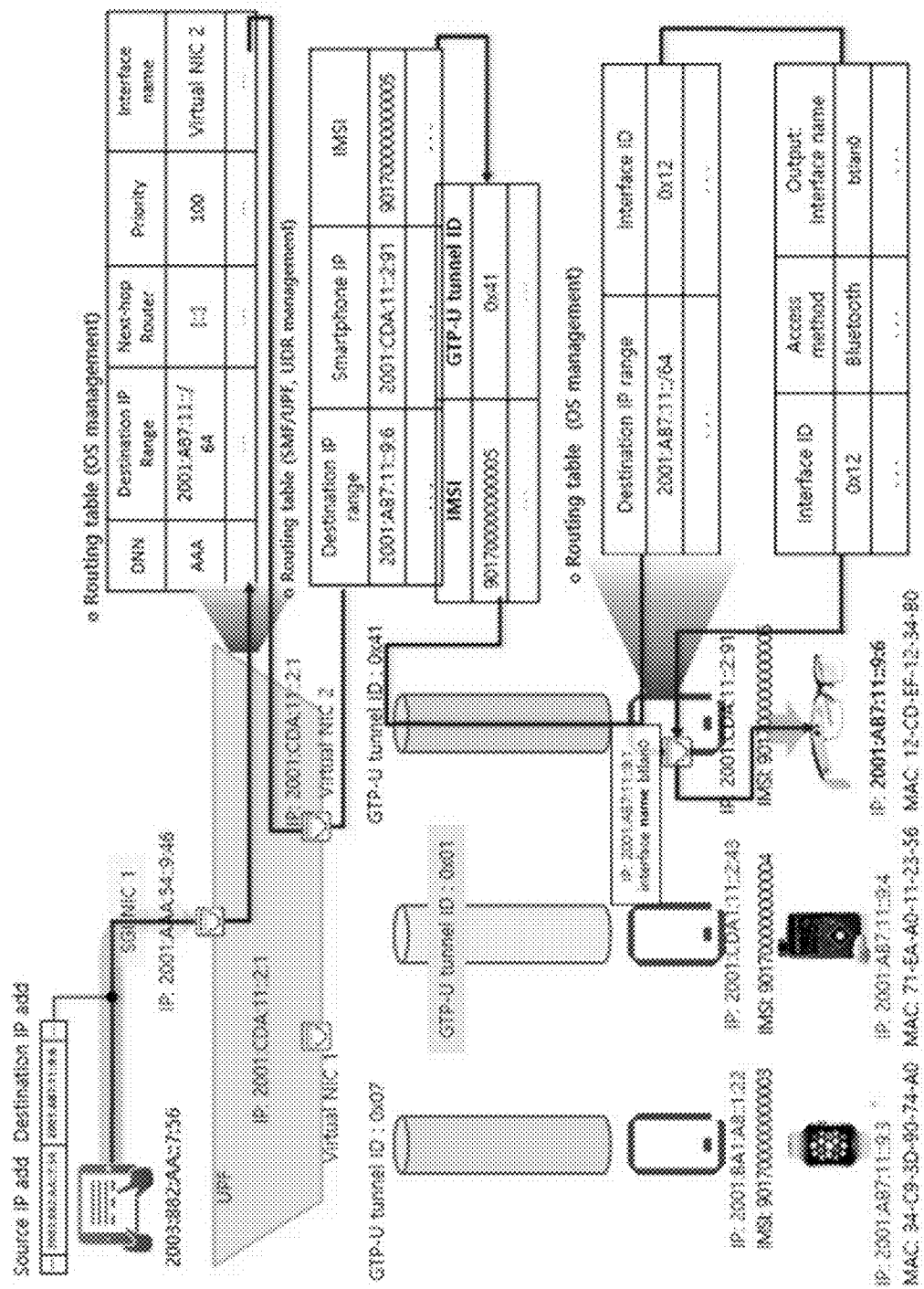
FIG. 15 is a diagram for explaining an operation for transmitting traffic from an external device to a second device in accordance with an embodiment.

FIG. 14 is a diagram for explaining an operation for transmitting traffic from a second device to a foreign device in accordance with an embodiment. FIG. 15 is a diagram for explaining an operation for transmitting traffic from an external device to a second device in accordance with an embodiment.

In FIG. 14 and FIG. 15, UE 100 and UPF 210 may perform as a router that process traffic generated and transmitted by second device 400 or delivered to second device 400. Core network 200 may distribute a routing policy (e.g., routing table or packet filtering policy). Further, the routing policy may define a traffic path of traffic having the IPv6 address of second device 400 as a source IP address or a destination IP address. A routing policy distributed to UE 100 could be different from that distributed to UPF 210.

The description related to FIG. 14 may be applied to a second device configured for one-way communication and applied to a second device configured for bidirectional communication.

Traffic generated and transmitted by second device 410 may have the IPv6 address of second device 410 as a source IP address (e.g., 2001:AB7:11:9:3). Also, traffic transmitted to second device 410 may have a destination IP address (2003:882:AA::7:56).

Meanwhile, when traffic is received from second device 410, UE 100 transmits the traffic to UPF 210 based on a routing policy. In particular, UE 100 may decide an access interface (btlan0) received the traffic from second device 410, decide an interface ID (0x11) corresponding to the received interface ID (btlan0), and transmit the traffic to UPF 210 through an interface (dnic1) corresponding to the decided interface ID (0x11).

In this case, the traffic is delivered to UPF through GTP-U tunnel (0x07) generated between UE 100 and UPF 210. In this case, UPF 210 receives virtual NIC2 forming the GTP-U tunnel (0x07) with UE 100 and transmit the traffic according to an IP range (2003:882:AA::7/80) which the destination IP address (2003:882:AA::7:56) of the traffic belong to. In this case, the traffic is arrived at another device 2000 (e.g., destination) through core network 200.

The traffic arrived at another device 200 (e.g., destination) may include a source IP address (2001:AB7:11::9:3). It is not an IP address of UE 200. It is the IP address of second device 410. That is, second device 410 is able to communicate with devices and servers on the public network using own IP address.

FIG. 15 is a diagram for explaining an operation for transmitting traffic from a foreign device to a second device in accordance with an embodiment. The description of FIG. 15 may be applied to a process of receiving traffic from a second device configured with bidirectional communication.

Traffic generated and transmitted by foreign device 2000 has an own IP address as a source IP address (2003:882:

AA::7:56) and the IPv6 address of second device 410 (2001:AB7L11::9:6) as a destination IP address. Core network 200 may be able to process traffic having the IPv6 address of second device 410 as a destination address (for example, at step S350).

In particular, UPF 210 of core network 200 may receive traffic having the IPv6 address of second device 410 as a destination address. The traffic is transmitted from foreign device 2000, processed by network equipments in core network 200 or other network based on a routing policy, and arrived at UPF 210.

UPF 210 may determine one GTP-U tunnel corresponding to the IPv6 address among a plurality of GTP-U tunnels using the destination IP address (2001:AB7:11::9:6).

For example, UPF 210 may determine an interface (virtual NIC 2) corresponding to the destination IP address (2001:AB7:11:9:6) using the destination IP address of second device 410. That is, UPF 210 may be connected to a plurality of UEs through a plurality of interfaces (virtual NICs) and select one corresponding to the destination IP address (2001:AB7:11::9:6) based on the routing policy among the plurality of interfaces. In this case, UPF 210 may select an interface (virtual NIC 2) corresponding to a destination IP range (2001:AB7:11::/64) including the destination IP address (2001:AB7:11::9:6).

After selecting the interface (virtual NIC 2), UPF 210 may determine a GTP-U tunnel (0x41) matched to the destination IP address (2001:AB7:11::9:6) or an IP range including the destination IP address using the destination IP address (2001:AB7:11::9:6). In more detail, one interface (e.g., virtual NIC 2) may be connected to a plurality of GTP-U tunnels. UPF 210 may select one GTP-U tunnel corresponding to the destination IP address (2001:AB7:11::9:6) among a plurality of GTP-U tunnels connected to one of interface (e.g. virtual NIC 2) based on the routing policy. Then, UPF 210 may transmit traffic to UE 100 through the selected GUP-U tunnel (0x41).

In this case, UPF 210 may perform a routing process further quickly using the IPv6 Prefix or hierarchical information included in the IPv6 address. For example, UPF 210 refers only the IPv6 prefix of the destination IP address (2001:AB7:11::9:6) to select an interface (e.g., virtual NIC 2) and a GTP-tunnel corresponding to the destination IP address (2001:AB7:11::9:6).

Meanwhile, between UPF 210 and UE 100, a communication tunnel dedicated for UE 100 is established as well as the GTP-U tunnel (0x41) for second device 410. In this case, UPF 210 may distinguish traffic having an IP address of UE 100 as a destination from traffic having an IPv6 address of second device 410 as a destination.

UE 100 may receive traffic having an IP address of second device 410 as a destination. UE 100 may select an access interface corresponding to an IPv6 address of second device 410 based on the routing table and transmit the traffic to second device 410 through the selected access interface.

In particular, one UE 100 may be connected to a plurality of second devices through a plurality of access interfaces. UE 100 may select one access interface (btlan0) corresponding to the destination IP address (2001:AB7:11::9:6) based on the routing policy among the plurality of access interfaces. In more detail, UE 100 selects an interface ID (0x12) corresponding to the destination IP address (2001:AB7:11::9:6), selects an access interface (btlan0) corresponding to the selected interface ID (0x12), and transmits traffic to second device 410 through the selected access interface (btlan0).

Meanwhile, UE 100 may select or decide access interface (btlan0) using both the IPv6 prefix and the auto configuration area in the destination IP address.

Traffic transmitted by foreign device 2000 to second device 410 may be a control message (instruction, command) for controlling second device 410. In this case, second device 410 may perform operations according to the control message. For example, second device 410 may be an insulin injection device attached on a body of a patient, and foreign device 2000 may be a user device of a doctor. In this case, the doctor may use his device 2000 to directly transmit a control message to second device 410 (e.g., insulin inserting device) to inject insulin to the patient. Typically, such message must be delivered by a smart phone (e.g., UE 100). That is, a second device request data to a smart phone, the smart phone requests corresponding data to doctor's device through a public network.

The insulin injection device can perform insulin injection actions based on insulin injection commands. Traditionally, only unidirectional communication was possible where the second device would request data from a smartphone, and the smartphone would request that data from a wireless network. In response, the wireless network would send the relevant data. Bidirectional communication, where an external device could send data (such as commands) directly to the second device via a wireless network, was not possible. However, according to the embodiments described above, control commands (e.g., control message) for the second device 410 may be transmitted to second device 410 without a request from either second device 410 or UE 100.

With the full-fledged launch of 5G mobile communication services characterized by ultra-high speed, ultra-low latency, and ultra-connectivity, the use of second devices in conjunction with smartphones is increasing. This is because they can complement features not supported by smartphones. For instance, to implement new services like Virtual Reality (VR) and Augmented Reality (AR), a second device separate from the smartphone is essential. Moreover, in the case of wearable devices, significant advancements have been made in the medical healthcare sector for recording and monitoring individual biometric information. In Industry 4.0's smart factories, novice technicians can efficiently work following the instructions of skilled technicians through smart glasses, leading to effective workflow and accident prevention. In the era of the Fourth Industrial Revolution, next-generation wearable devices powered by artificial intelligence are anticipated to be considered essential items in our lives alongside smartphones. According to the embodiments described above, based on the bidirectional communication of the second device, it can provide various services that were impossible with traditional second devices and can further evolve into diverse application services in the future. For instance, according to the embodiments described above, if a user simply places their smartphone in a specific location, bidirectional communication with nearby IoT devices becomes possible, and control commands can be directly sent to the IoT devices. Hence, the embodiments can be usefully employed in various application services. private IP address of a second device may be accommodated and managed as a public IP address without requiring establishing a VPN server, equipping a VPN function, or additional router. Consequently, the core network could process packets destined from the second device, enable bidirectional communication without any additional costs or equipment. This can satisfy the rapidly increasing bidirectional communication needs of IoT device.

As described, a mobile terminal (e.g., smartphone) may be utilized as a routing device in accordance with an embodiment. Therefore, the second device may be enabled to bidirectionally communicate with another devices connected to the core network. It alleviates the inconvenience of having to provide additional equipment for bidirectional communication of the second device.

In accordance with another embodiment, by using a mobile terminal (e.g., smartphone) as a routing device, it becomes possible to enable bidirectional communication for the second device, thus eliminating the inconvenience of needing additional equipment for the bidirectional communication of the second device.

In accordance with further another embodiment, by adopting an automatic IP configuration method using IPv6 and distributing configuration information for automatic IP configuration through the mobile terminal as a medium, there is an advantage that additional equipment is not required to assign an IP address to the second device.

In accordance with yet another embodiment, configuration information is distributed according to network standard specification. Accordingly, compatibility is improved with both existing core networks and smartphones. Additionally, it offers the benefit of reducing the necessity of extra equipments and features.

In accordance with still further another embodiment, a routing table is configured in UPF and UE and the traffic of second device is transferred based on the routing table. Accordingly, traffic with the IPv6 address of the second device as its destination can be smoothly delivered to the second device.

According to an embodiment, an IPv6 address of a second device is hierarchically generated. It enhances the speed of routing processing and offers the advantage of accommodating the rapid increase in IoT devices.

Even without a SIM card installed in the second device, by accommodating its IP address as a public IP address in the core network, there is an advantage in reducing the manufacturing cost of IoT devices.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present disclosure can be embodied in the form of methods and apparatuses for practicing those methods. The present disclosure can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present disclosure can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present disclosure can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of a user equipment for enabling bidirectional communication of a second device, the method comprising:
transmitting a packet data unit (PDU) session establishment request to a core network for bidirectional communication of the second device;
receiving internet protocol (IP) configuration information for automatically configuring an IP version 6 (IPv6) address of the second device from the core network;
transmitting the IP configuration information to the second device;
receiving the IPv6 address of the second device, which is automatically configured based on the IP configuration information, from the second device; and
transmitting the IPv6 address of the second device to the core network,
wherein the IP configuration information received from the core network includes IPv6 prefix and an address generation rule.

2. The method of claim 1, wherein the IPv6 address of the second device includes a Prefix area including the IPv6 Prefix and an auto configuration area which is generated by converting identification information of the second device based on the address generation rule.

3. The method of claim 1, wherein:
the Prefix area includes 64 bits setup by the core network; and
the auto configuration area includes 64 bits configured by the second device.

4. The method of claim 1, wherein the IPv6 address of the second device include hierarchical information for hierarchically managing the IPv6 address of the second device.

5. The method of claim 4, wherein the hierarchical information include at least one of a service type of the second device, a tariff plan applied to the second device, and packet data network (PDN) information.

6. The method of claim 1, wherein:
the receiving IP configuration information comprises: transmitting an ICMPv6 router request to the core network; and receiving a response ICMPv6 message in response to the ICMPv6 router request, and
the received response ICMPv6 message includes the IP configuration information.

7. The method of claim 1, wherein:
the transmitting IP configuration information to the second device comprises: receiving an ICMPv6 router request message from the second device; and transmitting a response ICMPv6 message in response to the received ICMPv6 router request message,
the transmitted ICMPv6 router advertisement message include the IP configuration information.

8. The method of claim 1, further comprising:
after transmitting the IPv6 address of the second device to the core network, receiving traffic having the IPv6 address of the second device as a destination; and
selecting an access interface corresponding to the IPv6 address of the second device based on a routing table, transmitting traffic to the second device through the selected access interface.

9. A method of a core network for enabling bidirectional communication of a second device, the method comprising:
generating a packet data unit (PDU) upon receiving a PDU session establish request for communication of a second device from a user equipment (UE);
transmitting Internet Protocol (IP) configuration information for automatically configuring an IPv6 address of the second device to the UE;
receiving an IPv6 address of the second device from the UE; and
processing traffic having the IPv6 address as a destination using the received IPv6 address,
wherein the generating a packet data unit (PDU) comprises:
upon receiving the PDU session establish request, receiving by SMF information necessary for generating the IP configuration information from DN-AAA.

10. The method of claim 9, wherein the transmitting IP configuration information comprises:
transmitting the IP configuration information including IPv6 prefix and address generation rule to the UE.

11. The method of claim 10, wherein in the transmitting the IP configuration information, the IPv6 Prefix is generated to include hierarchical information for hierarchically managing the IPv6 address of the second device.

12. The method of claim 10, wherein the IP configuration information further includes PDN information.

13. The method of claim 9, the transmitting IP configuration information comprises:
receiving an ICMPv6 router solicitation message from the UE;
including the IP configuration information to a response ICMPv6 message in response to the ICMPv6 router solicitation message.

14. The method of claim 9, wherein the receiving an IPV6 address of the second device comprises:
Authenticating the second device using an address generation rule stored in the core network, identification information of the second device, and the received IPv6 address.

15. The method of claim 9, wherein processing traffic comprises;
receiving traffic having the IPv6 address of the second device as a destination by UPF of the core network;
selecting a GTP-U tunnel corresponding to the IPv6 address of the second device, using the IPv6 address of the second device;
transmitting the traffic to the UE through the selected GTP-U tunnel.

16. A method of a second device for enabling bidirectional communication, the method comprising:
receiving internet protocol (IP) configuration information for automatically configuring an IP version 6 (IPv6) address of the second device from a core network through a user equipment;
generating the IPv6 address using information in the IP configuration information; and transmitting the generated IPv6 address to the core network through the UE,
wherein the IP configuration information includes IPv6 prefix and an address generation rule to the UE.

17. The method of claim 16, wherein the generating IPv6 address comprises:

generating an IPv6 prefix area of the IPv6 address by inserting the IPv6 Prefix in the IP configuration information, which is generated by the core network based on scription and management information of the second device and a network policy; and
generating an auto-config area of the IPv6 address by converting identification of the second device based on the address generation rule.

* * * * *